(12) United States Patent
White et al.

(10) Patent No.: US 7,255,399 B2
(45) Date of Patent: Aug. 14, 2007

(54) THIN PROFILE FOLDING VEHICLE SEAT

(75) Inventors: Brennon White, Commerce, MI (US);
William H. Jones, Lake Orion, MI (US); Kurt Seibold, South Lyon, MI (US); Kyle M. Doxey, Ann Arbor, MI (US); Patricia L. Conn, Linden, MI (US); Alan J. King, Wixom, MI (US); Vanja Cemalovic, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 405 days.

(21) Appl. No.: 10/515,160

(22) PCT Filed: Nov. 7, 2003

(86) PCT No.: PCT/US03/35537

§ 371 (c)(1),
(2), (4) Date: Nov. 19, 2004

(87) PCT Pub. No.: WO2004/043730

PCT Pub. Date: May 27, 2004

(65) Prior Publication Data

US 2006/0061183 A1    Mar. 23, 2006

Related U.S. Application Data

(60) Provisional application No. 60/454,379, filed on Mar. 13, 2003, provisional application No. 60/425,225, filed on Nov. 8, 2002.

(51) Int. Cl.
*B60N 2/30* (2006.01)
(52) U.S. Cl. .................. 297/378.12; 297/15; 297/334; 248/421; 296/65.09

(58) Field of Classification Search .................. 297/15, 297/331, 334, 341, 378.1, 378.12; 248/421, 248/422; 296/65.01, 65.03, 65.05, 65.09
See application file for complete search history.

(56) References Cited

U.S. PATENT DOCUMENTS 1,729,669 A    10/1929   George (Continued)

FOREIGN PATENT DOCUMENTS

DE    295 12 327 U1    9/1995

(Continued)

OTHER PUBLICATIONS

International Search Report based on International Application No. PCT/US03/35537, date of mailing May 4, 2004, (2 pages).

*Primary Examiner*—Peter R. Brown
(74) *Attorney, Agent, or Firm*—Foley & Lardner LLP

(57) ABSTRACT

An ultra compact, easy to operate folding vehicle seat includes a seat back, seat base and support leg members and is movable between a stow position and a design position. The folding vehicle seat includes a folding mechanism having an upper member for connection to the seat back and a lower member for supporting the seat base; the upper and lower members of the folding mechanism include integrated teeth aligned in meshing relationship such that movement of the seat back causes the lower member to rotate and lift the seat base to move the folding vehicle seat to a design position. A pair of upper cams are provided for selective engagement with the upper member and a third cam tab of the lower member of the folding mechanism.

20 Claims, 19 Drawing Sheets

U.S. PATENT DOCUMENTS

| | | | |
|---|---|---|---|
| 3,311,405 A * | 3/1967 | Brennan et al. | 296/66 |
| 4,805,953 A * | 2/1989 | Yamauchi | 296/65.09 |
| 5,482,349 A | 1/1996 | Richter et al. | |
| 5,570,931 A * | 11/1996 | Kargilis et al. | 297/378.12 |
| 5,588,707 A | 12/1996 | Bolsworth et al. | |
| 6,000,742 A * | 12/1999 | Schaefer et al. | 296/65.09 |
| 6,152,533 A | 11/2000 | Smuk | |
| 6,749,169 B2 | 6/2004 | Becker et al. | |
| 6,902,236 B2 * | 6/2005 | Tame | 297/331 |
| 7,137,666 B2 * | 11/2006 | Haladuda et al. | 297/378.12 |

FOREIGN PATENT DOCUMENTS

| | | |
|---|---|---|
| DE | 100 55 205 A1 | 6/2002 |
| EP | 0 985 575 A2 | 3/2000 |

* cited by examiner

THIN PROFILE FOLDING VEHICLE SEAT

BACKGROUND OF THE INVENTION

The present invention relates generally to the field of seats. More particularly, it relates to folding vehicle seats for vehicle non-operator positions.

A wide variety of vehicle non-operator designs and devices (e.g., other than the driver's position) are known. The variety of such seats is increasing at a rapid pace due to the increasing popularity of non-traditional vehicles as compared to the standard two-row sedans, wagons and trucks. For example, vans, sport utility vehicles (SUV), cross-over utility vehicles (CUV), station wagons, pick-up trucks, and other vehicles include additional rows of seating, and many of them provide for the reconfiguration and/or removal of the second and/or third row of seats thereof to increase the cargo storage space for the vehicle.

In larger SUVs, vans and even minivans, there is sufficient room within the entire vehicle that there is less of a need to provide a second and/or third row vehicle seat that can be stowed in a relatively ultra compact package. However, to have such an option would be advantageous. Notwithstanding, it has been common to provide conventional vehicle seats in such larger vehicles and to provide some level of adjustment or folding to give the vehicle user additional storage options and area. Further it is known to make such seats so they may be removed from the vehicle. In this regard, there has been an effort to make such seats lighter. Despite these efforts there remains a significant need to continue to make such seats lighter and more compact.

In relatively smaller SUVs, minivans, CUVs and station wagons, there is less room to provide a relatively bulky and massive vehicle seat since the vehicle user typically desires as much cargo space as possible but still needs the ability to provide occupant seating for up to seven or eight occupants. In many cases, the seats which are used for such purposes (and in particular for third row applications) are used by vehicle passengers on only limited occasions, and the result has been that such seats are not particularly comfortable. Such seats also tend to be relatively bulky and, if left in the vehicle, reduce the amount of cargo space which may be used for a wide variety of purposes. Ultimately, many of the seating systems known to the art can be removed from the option of the operator and stored in the garage or other location where the vehicle is kept. However, conventional seats tend to be too heavy and bulky for removal by even an average user let alone smaller operators or people who are elderly or otherwise do not have the sufficient strength to manipulate the heavy and bulky seat designs. While some devices have been developed to help in this regard such as by adding wheels to the seat, they have proved insufficient and there is a continued need to improve seats in this regard.

In addition to the above, as the increase for higher efficiency vehicles continues, reduced weight and size remain core objectives to achieving this goal. Accordingly, the amount of interior space allowed for vehicle seats continues to be reduced. This fact is further emphasized for seating in the cargo area of the vehicle such as with third row seats. Commonly, there is very little floor space available for folding and stowing these types of seats.

In view of the above, there is a current trend to develop thinner profile and lighter seats. However, these efforts have focused on optimizing current designs to simply be thinner and lighter resulting in decreased occupant comfort.

Numerous types of conventional folding seats are known for use in vehicle seats. For example, many of these devices involve traditional recliner mechanisms for reclining the vehicle seat back and which may also be used for folding the vehicle seat. Other types of mechanisms include latch mechanisms for folding the vehicle seat such as that disclosed in U.S. Pat. Nos. 4,268,086; 4,484,779; 4,822,100; 6,089,664; 6,152,533 and 6,328,381. While these mechanisms will provide a folding seat, they do not provide a sufficiently simple and compact folding mechanism.

While other conventional approaches are known to provide a folding seat that can be stowed in the vehicle floor or bottom, conventional seats have not been designed to provide less than approximately a 200 millimeter thickness. Despite the above efforts, there is a need to develop a vehicle seat that is foldable for storage or removal to a highly compact thickness and significantly less than a 200 millimeter thickness. In particular, the remains a continued need to provide even more storage area in a vehicle's cargo area while retaining as much functionality and convenience as possible. While some folding seat solutions help in this regard they have many drawbacks such as taking up substantial floor space because they do not fold in a compact manner, taking up substantial cargo space because they do not have a thin profile, are expensive and heavy due to complicated and bulky mechanisms.

Thus, there is a continued need to develop a vehicle seat that can be made foldable for storage and/or removal to less than a 150 millimeter thickness and optimally to approximately a 100 millimeter thickness package while still providing a vehicle seat occupant relative comfort and support.

Conventional folding seats have also been poorly designed since they require a large amount of floor space to be folded and stowed. Thus, there remains a need to provide a vehicle seat capable of providing a fold in spot, compact footprint package. There also remains a continued need to develop a vehicle seat that will, in a folded position, provide a minimized and light-weight cartridge and that will, in a deployed position, provide the support and comfort of a conventional non-stow, type vehicle seat. Some conventional systems have attempted to develop solutions to vehicle seating which undesirably require changes to the vehicle's body in white resulting in significant additional cost and a highly undesirable lack of flexibility. Some conventional folding vehicle seat systems have provided foldable seats but once in the folded position have the highly undesirable drawback of not having a vehicle seat design capable of providing a flat load floor.

Thus, there remains a continued need to provide a vehicle seat capable of overcoming the noted deficiencies with the conventional vehicle seats. In particular, there is a continued need for a vehicle seat having a very compact footprint in both the design and stow positions and which may be very easily and intuitively operated and removably provided in a passenger or cargo area of a vehicle.

SUMMARY OF THE INVENTION

One embodiment of the invention relates to a folding vehicle seat capable of being stowed in a minimal amount of space. The folding vehicle seat includes a seat back, a seat base, at least a pair of legs for supporting the front of the seat base and a folding mechanism including a lower arm or member acting as a leg for supporting the rear of the folding vehicle seat, the folding mechanism is preferably synchronously operative for moving the seat between a stow position, in which the seat back is adjacent with the seat base and the legs of the seat are folded rearward to a position substantially parallel with the seat base frame, and a design position in which the seat is usable by an occupant located in a conventional seating position, in which the folding mechanism is locked.

In the one embodiment, the folding mechanism further preferably includes a first or upper member having a first end for connection with the seat back of the folding vehicle seat, and the second or lower member has a first end for connection to a support or floor of the vehicle. The folding mechanism further preferably includes a first pivot support member or post on which the first or upper member pivots and a second or lower pivot support member or post on which the second lower member rotates.

In one embodiment, the first and second pivot support members are preferably carried by a cover plate to which the seat base is connected. Each of the first and second members of the folding mechanism have a second end each having a plurality of teeth aligned to mesh with each other such that when the seat back is rotated, the upper member fixedly connected thereto and meshing with the lower member, synchronously causes the folding vehicle seat to move between the stow and design positions. In particular, the movement of the seat back and the upper member rotating in one direction cause the lower member to synchronously move in an opposite direction. In the one embodiment, the seat base is connected to the lower member and its respective front leg such that as the seat back is rotated from the stow position, the lower member is rotated upward from a substantially horizontal position to move the seat base using a four bar linkage mechanism.

In the one embodiment, a first upper cam is pivoted on a pin member with respect to the first upper member such that when the first upper cam is in a first or locked position, the seat back is prevented from moving from the design position and when the first upper cam is moved from the first position, the first upper arm member is free to pivot on the upper support pivot post. In one embodiment, a second upper cam is provided aligned with the first upper cam. Preferably the second upper cam is pivoted on the same axis as the first upper cam by being located on the same pin member.

The second upper cam is disposed aligned with a third or lower cam tab connected to the second lower leg member and a fourth upper cam tab connected to the first upper arm member. When the second upper cam is in the first or locked position, the first upper arm member and the second lower leg member are locked in the design position due to the second cam member being blocked by the respective cam tabs. In one embodiment, the folding mechanism includes a handle connected to the pin member carrying the first and second upper cams. In one embodiment the first and second upper cams are biased into the first position to lock the folding mechanism in the design position.

Preferably a pin member interconnects the first upper cam with the second upper cam. Thus, when the first upper cam is rotated free of an abutment surface on the first upper member, the second upper cam is rotated free of the upper and lower cam tabs connected to the first upper arm member and the second lower leg member, respectively, such that the members are allowed to rotate in opposite directions due to the meshed teeth shared between the first and second members of the folding mechanism.

In the one embodiment, a handle member is connected to the pin member for use by a user of the folding vehicle seat for selectively activating the folding mechanism. When a user moves the handle member, the pin member is moved (preferably rotated) causing the first and second upper cams to move (again preferably to rotate against the biasing force) thereby disengaging the first upper cam from the first upper member and the second upper cam from the third lower cam tab of the second lower member. In one alternate embodiment, the pin member interconnecting the first and second upper cam members is designed to provide a timing mechanism such that when the handle member is activated the first upper cam begins to move a predetermined distance before the second upper cam member begins to move. The biasing mechanism acting against the first and second upper cams are such that when a user moves the seat back into the design position, the first and second cams will engage the third and forth cam tabs to lock the folding mechanism which corresponds with the vehicle seat being the design position.

In one embodiment of the present invention, the folding mechanism and folding vehicle seat are operated to move the vehicle seat from the stow position to the design position by a user simply moving the seat back of the folding vehicle seat in a one hand operation. In one alternate embodiment, the folding vehicle seat is provided with a lock mechanism for locking the folding vehicle seat in the stow position. In this embodiment, the user unlatches the lock mechanism and then moves by rotating the seat back to move the folding vehicle seat from the stow position to the design position.

In an alternate embodiment of the present invention, the folding vehicle seat includes a motor connected to the folding mechanism for the motorized control of the folding vehicle seat. In this embodiment, the user activates a switch for initiating the motor to move the vehicle seat between the stow and design positions. The motor is preferably connected to the seat base frame along one side member and engages the first upper member for moving the first upper member and seat back. In a further alternate embodiment of the present invention, the folding vehicle seat is provided with a seat cushion presenting device connected to the seat back such that when the folding mechanism moves the seat form the stow position to the design position, the seat cushion presenting device extends the seat back cushion.

Other ways in which the above-referenced features are accomplished will become apparent to those skilled in the art after they have read this specification, and such other ways are deemed by the present inventors to fall within the scope of the present invention.

DETAILED DESCRIPTION OF THE PREFERRED EMBODIMENTS

Figure 1:
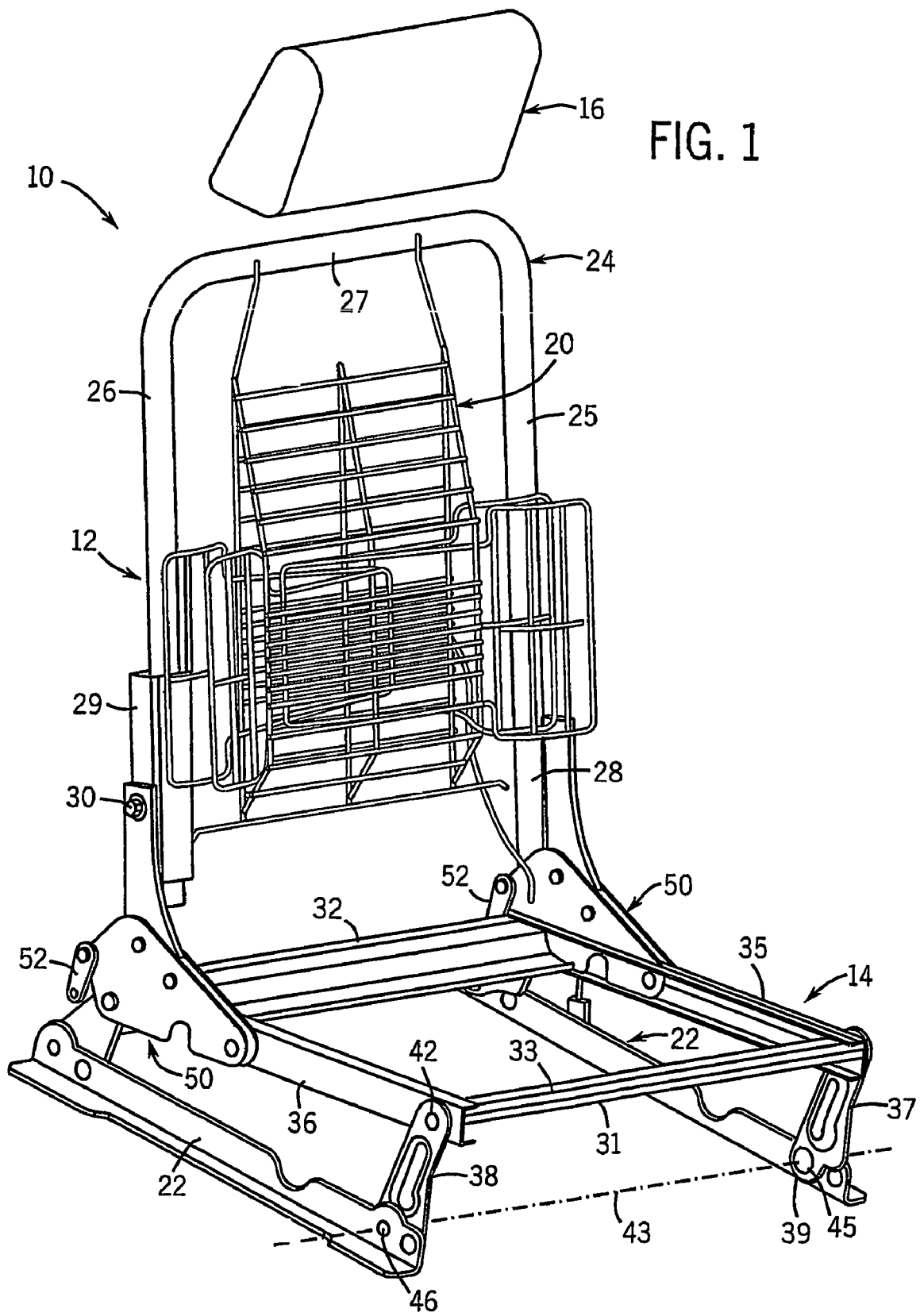
FIG. 1 is a perspective view of a folding vehicle seat according to the present invention.

Referring generally to FIG. 1 through FIG. 12 and more particularly to FIG. 1 through FIG. 8, there is shown a folding vehicle seat 10 according to the present invention including a seat back 12 and a seat base 14. The seat 10 further alternatively includes a headrest 16 which may be attached at the upper end of the seat back 12 as is conventional in the art of vehicle seats.

Preferably the seat back 12 is provided with a seat cushion presenting device 20 such as that disclosed in U.S. Patent Application No. 60/454,263, filed on Mar. 13, 2003, entitled Seat Cushion Presenter Device for Folding Seat, the disclosure of which is incorporated herein. Alternatively, the cushion presenting device may be an inflatable type mechanism such as that disclosed in the commonly assigned provisional patent application entitled Vehicle Seat Structures, in the name of White et al., filed on Nov. 8, 2002, Ser. No. 60/425,225, the disclosure of which is incorporated herein by reference.

Figure 13:
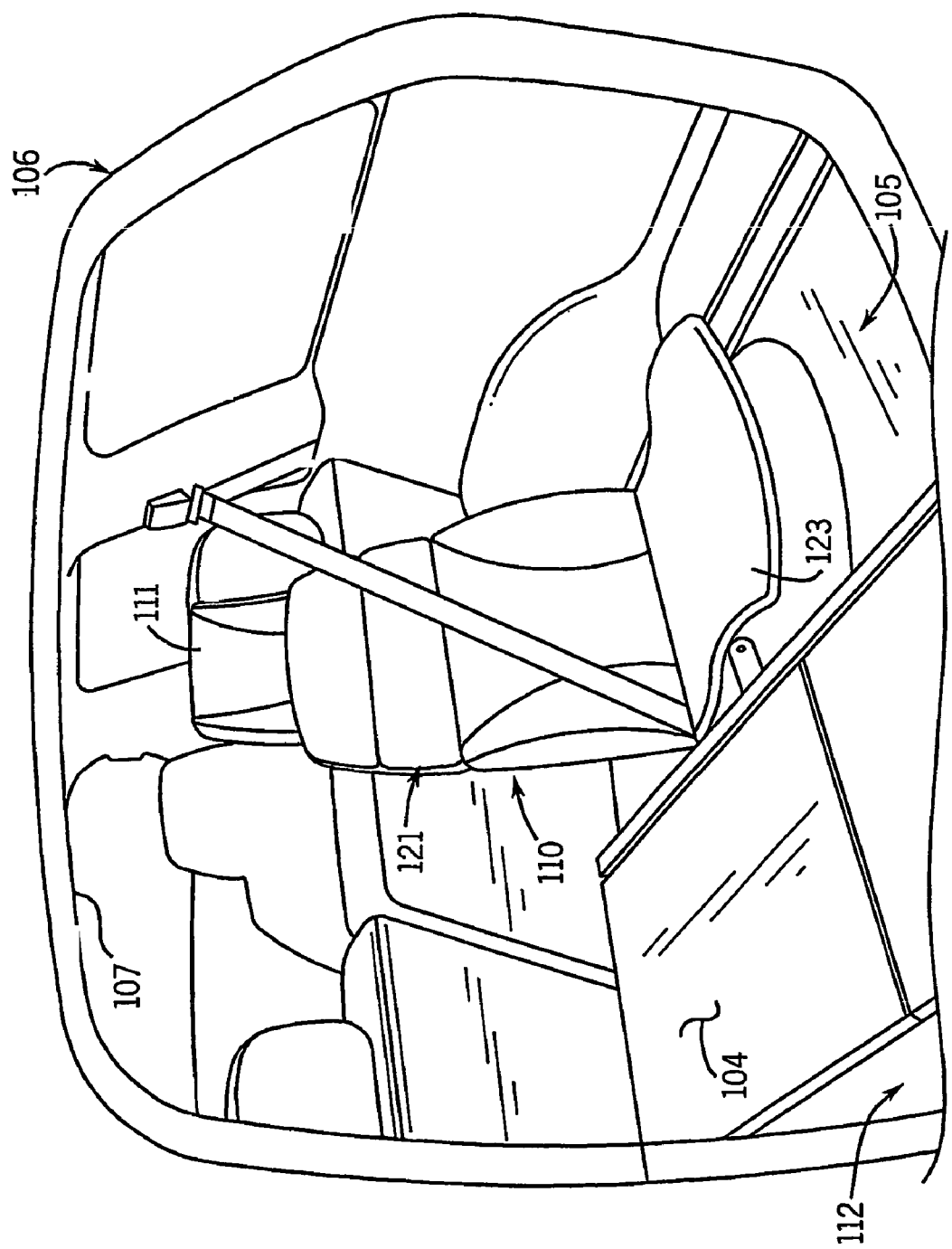
FIG. 13 is a perspective view of a fold flat vehicle seat according to the present invention.
Figure 14:
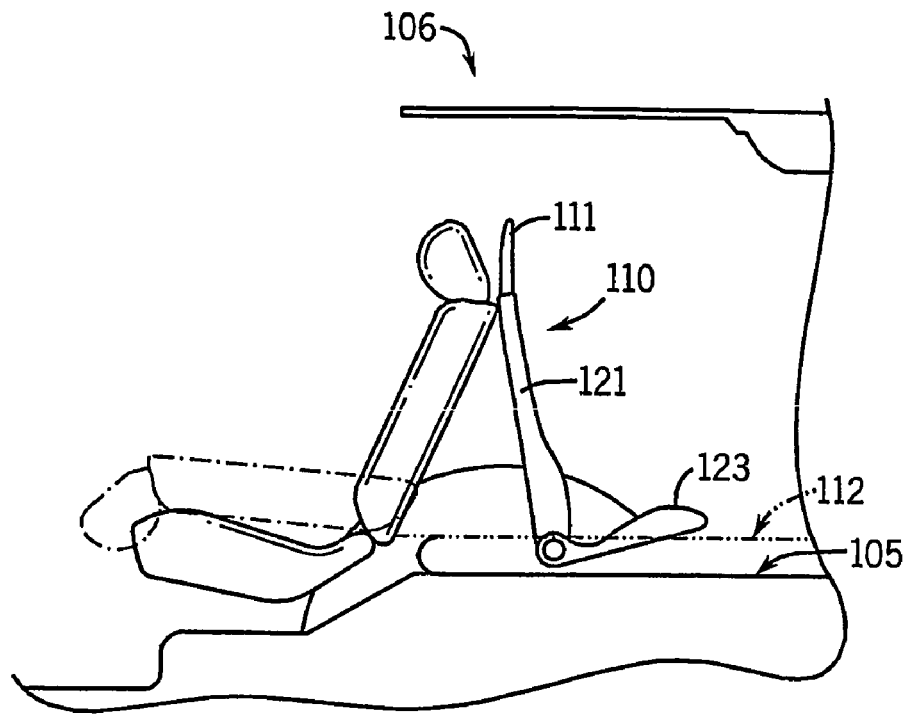
FIG. 14 is a side view of the seat of FIG. 13 showing the fold flat vehicle seat in a design position.
Figure 15:
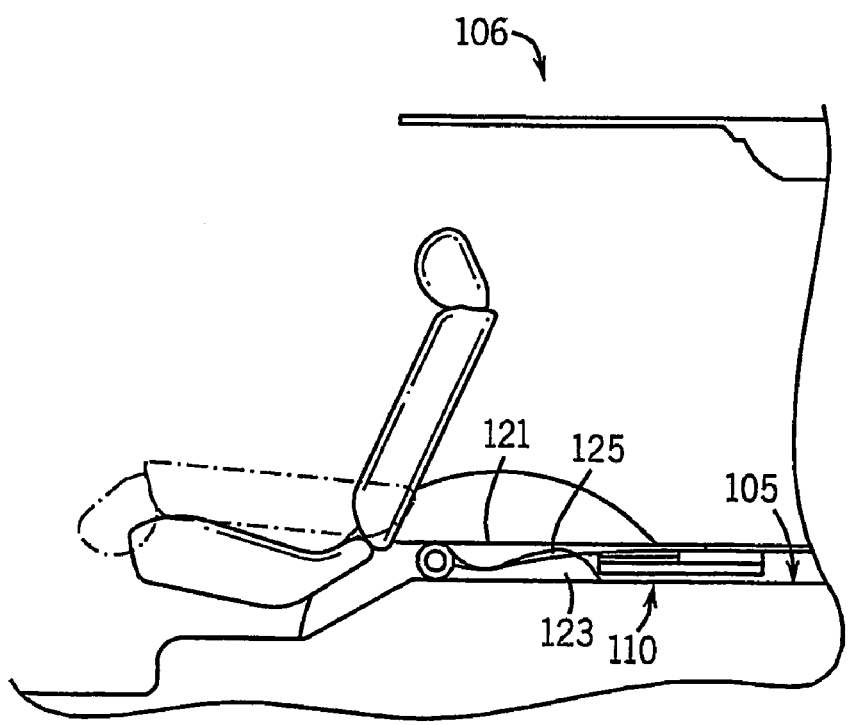
FIG. 15 is a side view of the seat of FIG. 13 showing the fold flat vehicle seat in a folded or stored position.
Figure 16:
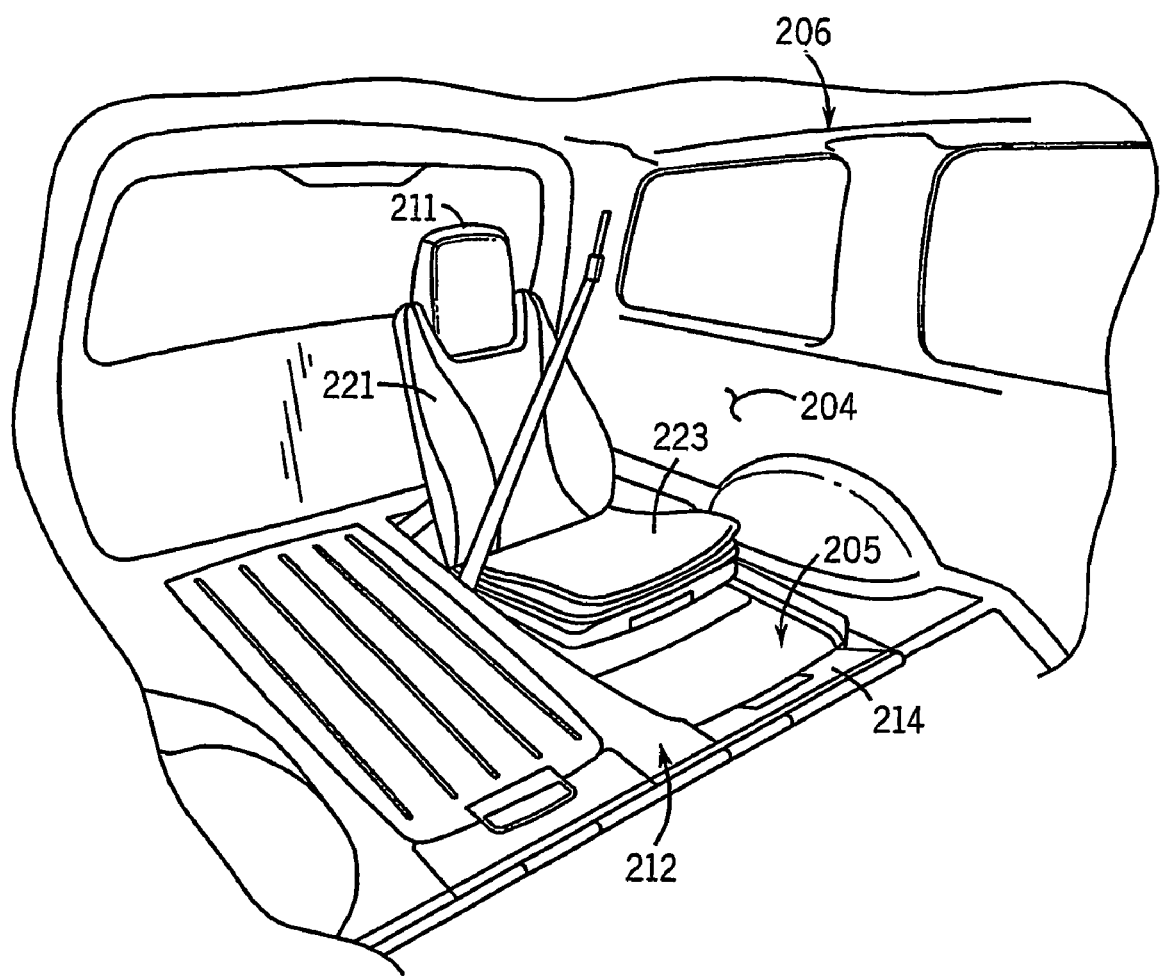
FIG. 16 is a perspective view of an inflatable cushion fold flat seat according to the present invention.

FIGS. 13–15 show a fold flat seat 110 in a rear compartment 104 of a vehicle 106 having a roof 107 of the type described in U.S. Patent Application No. 60/454,263. The seat 110 includes a headrest 111, a seat back 121 and a seat base 123. The seat 110 is supported in a recessed portion 105 of the floor 112 of the vehicle 106. The fold flat seat 110 is shown in a first or design position shown in FIG. 10. The fold flat seat 110 is designed to be very compact when it is located in a second or stowed position as shown in FIG. 15 wherein the seat back 121 and the seat base 123 are designed to mesh together to provide an overlap region 125. Despite being quite compact, the fold flat seat 110 of the present invention is capable of providing support and comfort to a variety of seat occupants as shown in outline form in FIG. 14. The fold flat seat 110 includes support contours in the seat back 121 and the seat base 123 normally found in fold flat seats having a far thicker profile when folded flat.

FIGS. 16–21 disclose a fold flat seat 211 for use in a rear cabin portion 204 of a vehicle 206 having a recessed portion 205 in a floor 212. The seat 211 may be folded flat to have a relatively very thin profile such that the required depth of the recess portion 205, for storing the seat 211, is minimized. The seat 211 includes a seat back 221 and a seat base 223. The seat back 221 is preferably adjustably connected to the seat base 223 using any known or appropriate mechanism for providing rotational coupling there between while still providing the required operation and load transferring capability of a seat for use in a vehicle 206.

Figure 20:
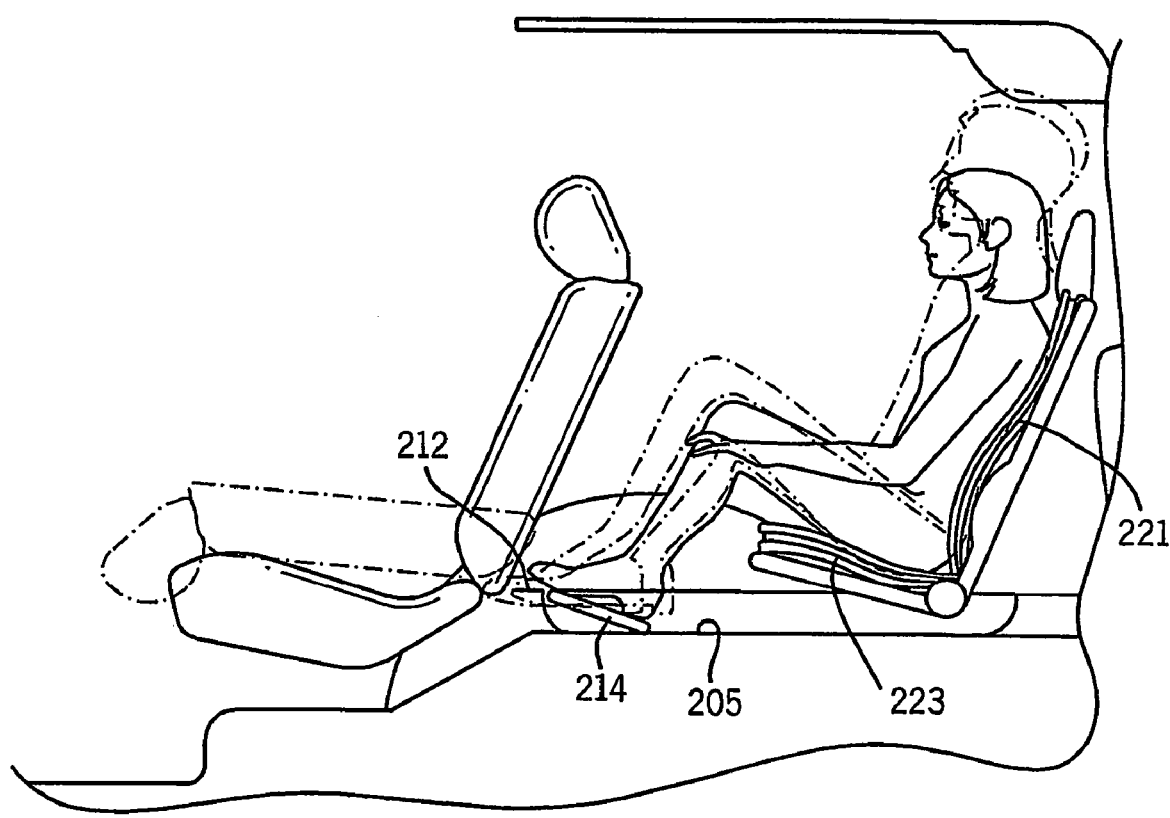
FIG. 20 is a side view of the inflatable cushion fold flat seat of FIG. 16 in a design position showing an occupant seated therein.
Figure 21:
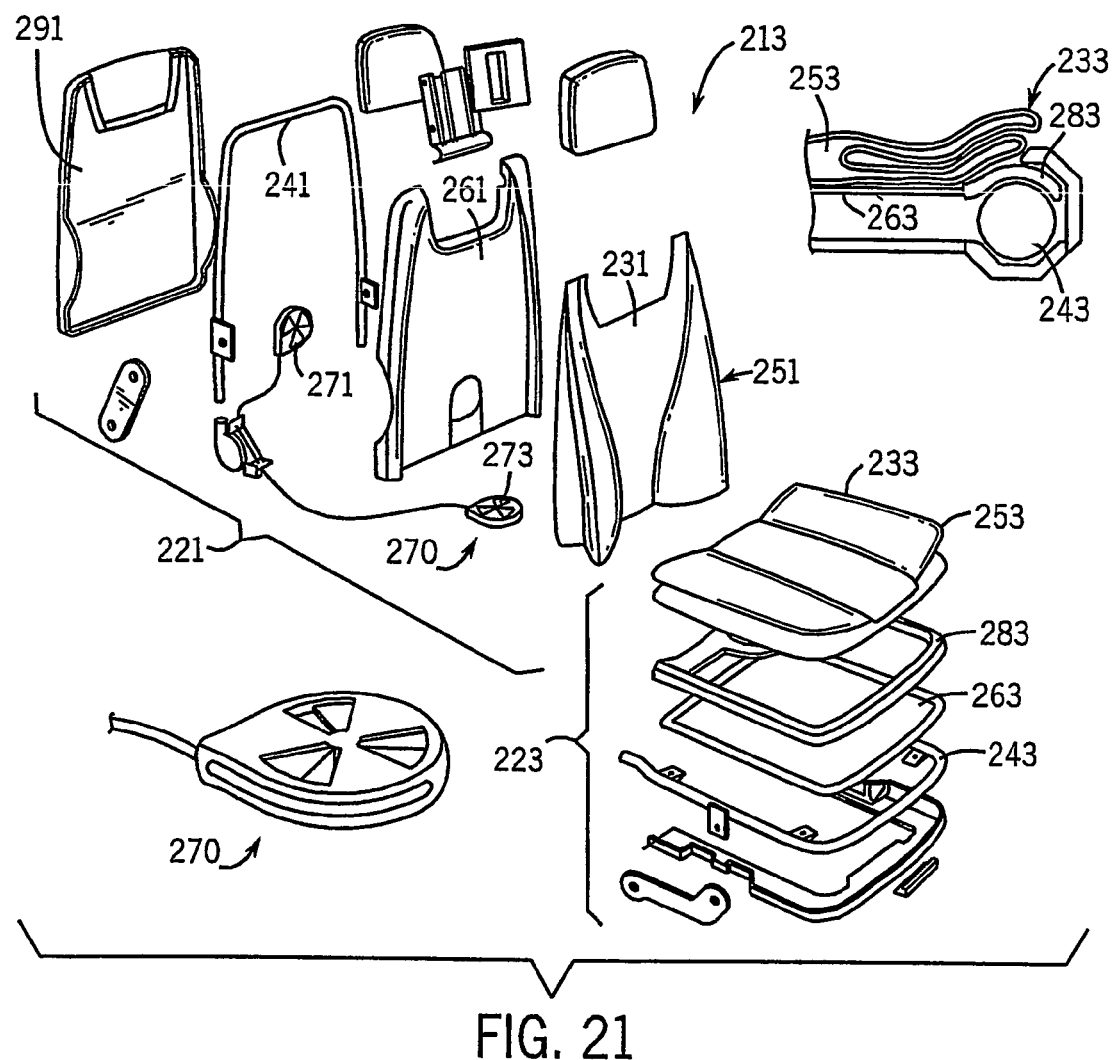
FIG. 21 is an exploded perspective view of the inflatable cushion fold flat seat of FIG. 16.

The fold flat seat 211 is designed to be stored in the recessed portion 205 such that when the seat 211 is in the stow or fold flat position, the back of the seat 211 constitutes a portion of the floor 212 of the vehicle 206. The floor 212 includes a flap portion 214 for providing access to the seat 211 and covering a portion thereof when the seat 211 is in the stow position. Further, the flap portion 214 is hinged to the floor 212 and pivots into the recessed portion 205 when the seat 211 is pivoted out of the recessed portion 205 such that the flap portion 214 provides a an angled support for the feet of an occupant of the seat 211 as best shown in FIG. 20.

The fold flat seat 211 includes a seat cushion member 230 including a seat back cushion portion 231 and a seat base cushion portion 233. The seat cushion member 230 is preferably designed to include a bladder system 250 capable of being inflated with air or another fluid for providing comfort and support to a seat occupant and raising the seat cushion members 231 and 233. Further, the bladder system 250 preferably provides seat cushion contours by providing bladder portions selectively through out the seat cushion member 230 such as thigh and side bolsters. The bladder system 250 preferably includes a bladder portion 251 aligned with the seat back cushion portion 231 and a bladder portion 253 aligned with the seat base cushion portion 233.

Figure 17:
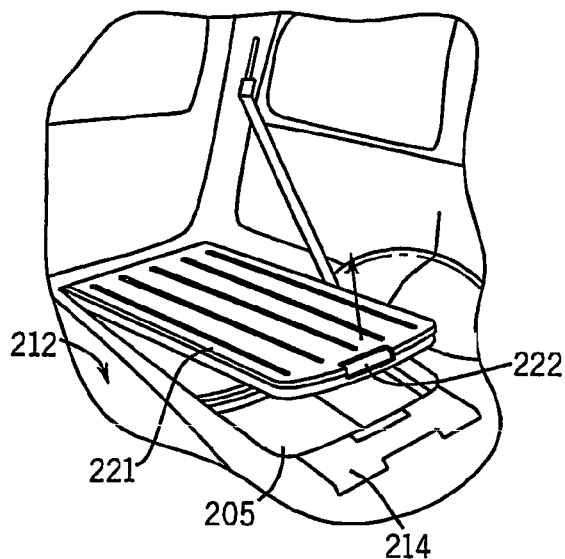
FIG. 17 is a perspective view of the inflatable cushion fold flat seat of FIG. 16 being moved from a storage position.
Figure 18:
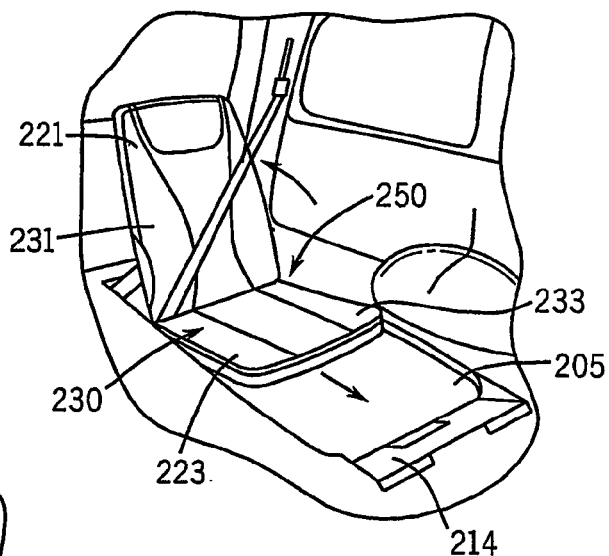
FIG. 18 is a perspective view of the inflatable cushion fold flat seat of FIG. 16 in a design position.
Figure 19:
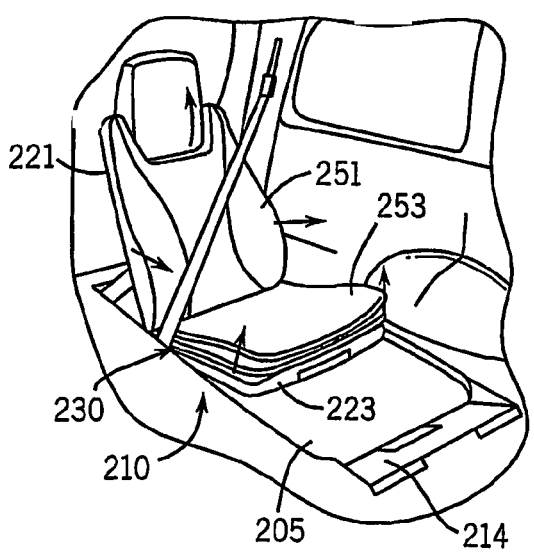
FIG. 19 is a perspective view of the inflatable cushion fold flat seat of FIG. 16 in a design position with the seat base and seat back cushions inflated.

As shown in FIGS. 17–19, the seat 211 is preferably movable between a first, stowed position and a second, deployed or design position. The seat 211, in the stowed position, is removed from the recessed portion 205 of the floor 212 of the vehicle 206, by pivoting the flap portion 214 and then moving the upper end of the seat back 221 such as by grasping a handle or recess portion 222 to rotate the seat back 221 from the recess 205 such as in the direction of the arrow in FIG. 17. It should be noted that when the seat 211 is folded flat in the recess portion 205, the bladder system 250 is substantially void of air or other fluid. Without most of the air in the bladder system 250, the seat 211 may achieve a much thinner profile than if all of the air was kept in the bladder system 250 such as is preferable to best support an occupant.

As the seat back 221 is moved to the design position shown in FIG. 18, the bladder system 153 is activated to cause air to fill the bladder system 250 to cause the bladder portion 251 of the seat back cushion portion 231 to inflate and the bladder portion 253 of the seat base cushion portion 233. Once the seat 211 is in the deployed position, the bladder system 250 is preferably deactivated, such as by turning off a valve, to trap the air therein and prevent its escape therefrom, such as would result from the occupant sitting in the seat 211.

The seat 211 is also preferably provided with a very simple and efficient air moving system 270 for moving air into and out of the bladder system 250. The air moving system 270 preferably includes a first fan motor 271 for use with the seat back bladder portion 251 and a second fan motor 273 for use with the seat base bladder portion 253.

The seat base 223 of the seat 211 preferably further includes a seat base frame member 243 having a substantially U-shape, a suspension member 263 supported on the frame member 243 and a seat base capture member 283 for capturing the suspension member 263 to the frame member 243. The seat base capture member further preferably has the seat base fan motor 273 connected thereto for communication with the seat base bladder portion 253 once the seat base cushion portion 233 is supported by the suspension member 263.

Similarly, the seat back 221 of the seat 211 preferably includes a seat back frame member 241 having a substantially U-shape configuration, a support member 261 having the seat back fan motor 271 connected thereto for communication with the seat back bladder portion 251 once the seat back cushion portion 231 is connected to the seat back support member 261. Additionally, the seat back 221 of the seat 211 includes a back cover 291 for closing out the seat back 221 and providing a portion of the floor 212 of the vehicle 206 when the seat 211 is in the stowed position.

Figure 22:
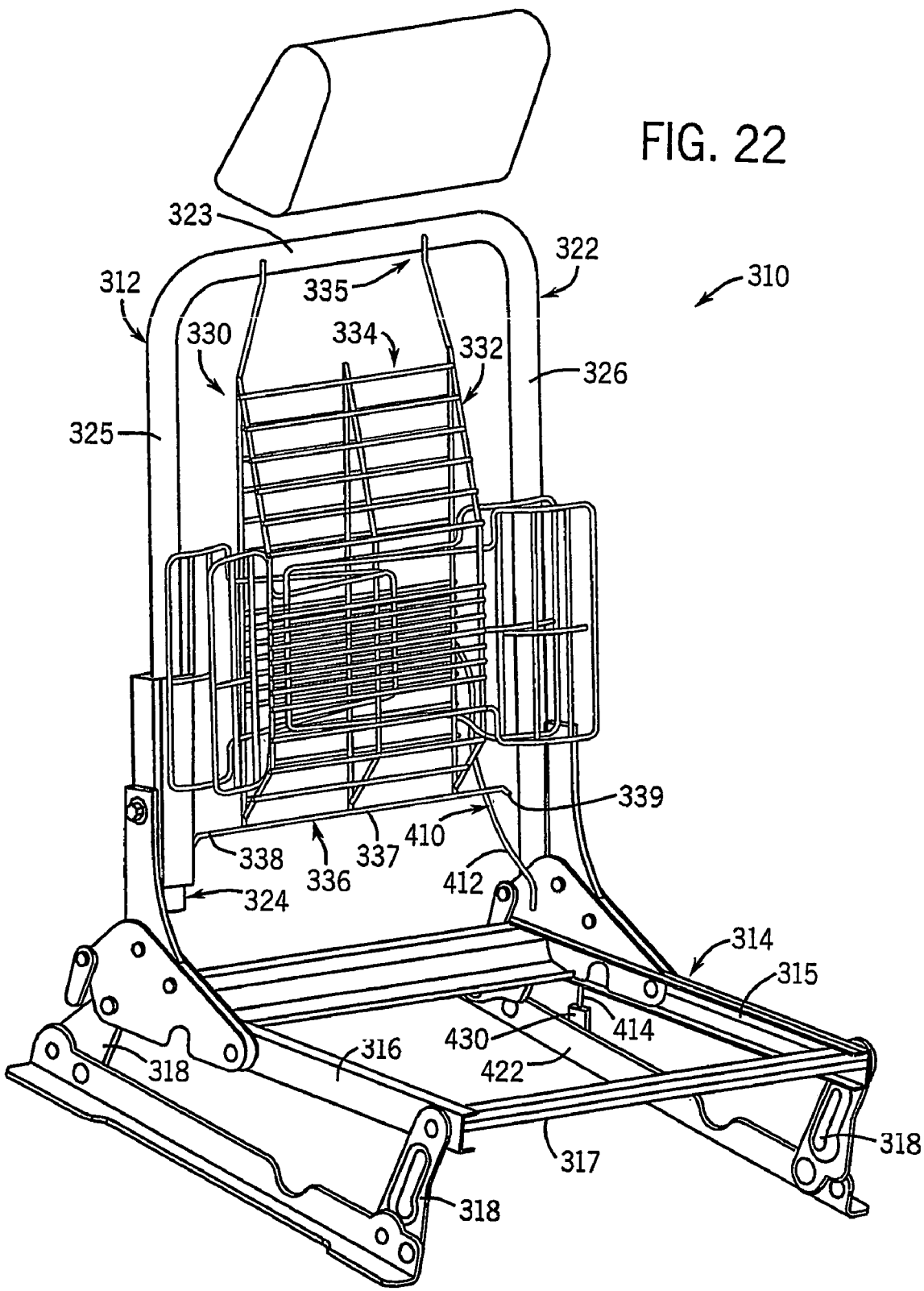
FIG. 22 is a front perspective view of a vehicle seat including a seat cushion presenting device according to the present invention.
Figure 23:
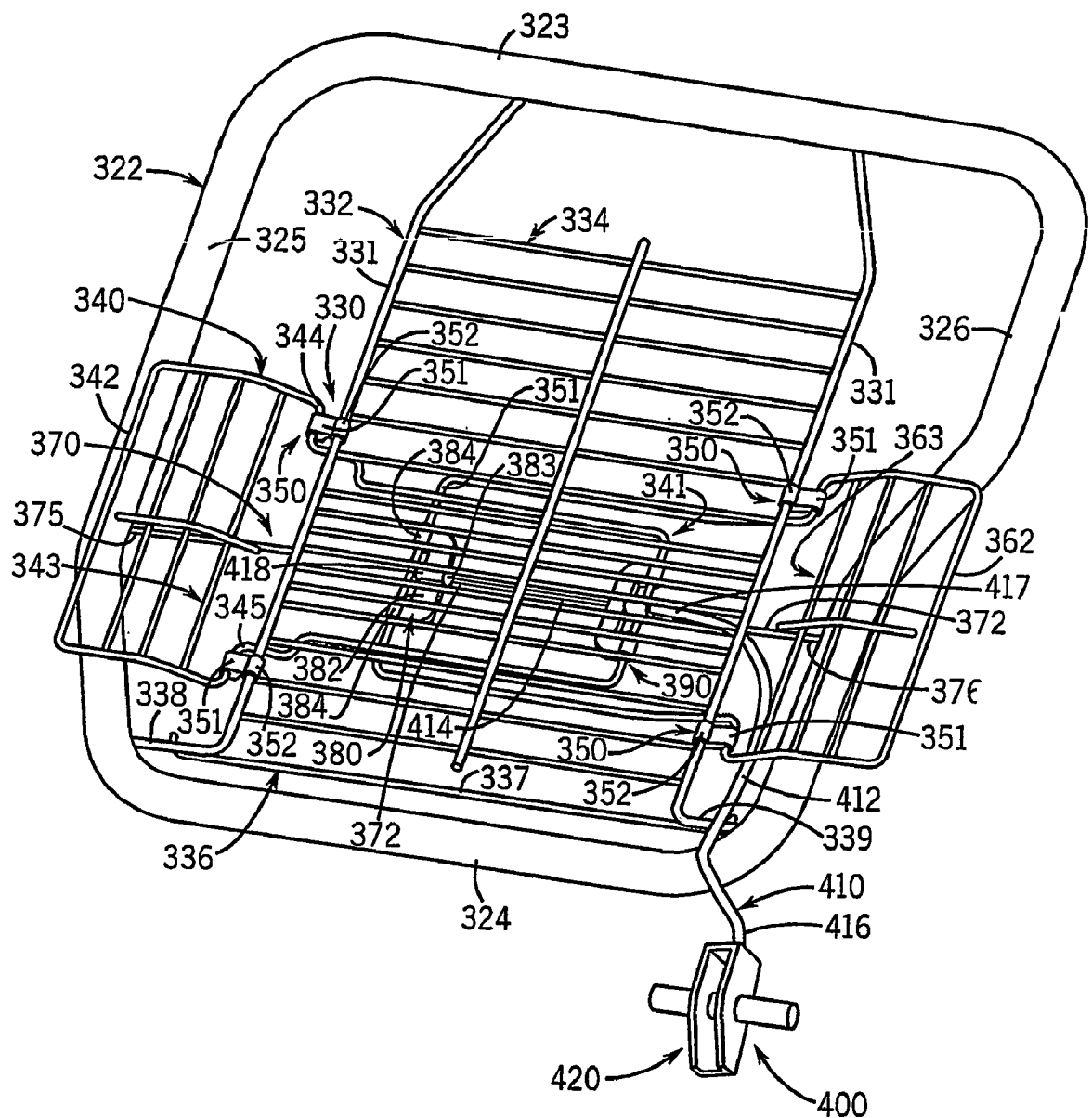
FIG. 23 is a front partial perspective view of a vehicle seat back member of the vehicle seat of FIG. 22 including a seat cushion presenting device according to the present invention.
Figure 24:
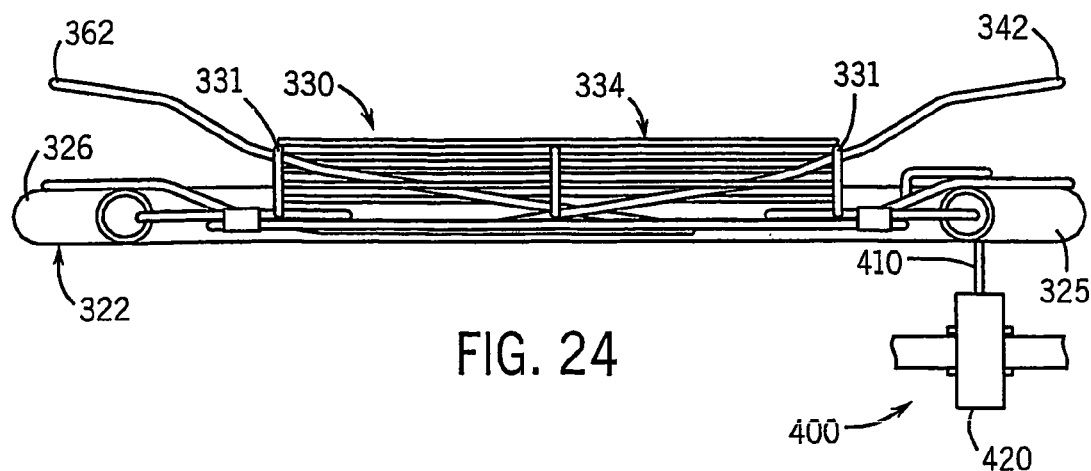
FIG. 24 is a partial end view of the vehicle seat back member of FIG. 22 showing the seat cushion presenting device in an extended or design position.

Referring generally to FIGS. 22–25 and more particularly to FIGS. 22–24, there is shown a vehicle seat 310 of the type described in U.S. Patent Application No. 60/454,263 including a seat back member 312 and a seat base member 314. The seat base member 314 includes side members 315 and 316 and front member 317. The vehicle seat 310 is preferably adapted to connect to a floor (not shown) of a vehicle (not shown) for movement between a stowed position and a design position as shown in FIG. 22. The vehicle seat 310 is preferably supported by legs 318 for moving the vehicle seat 310 between the stowed position and the design position. The vehicle seat 310 is disclosed as a single occupant seat but may alternatively be a multiple occupant design (such as a "bench" seat) and may also be part of a split seat such as a 50-50 or 60-40 split bench seat or any other configuration.

The seat back member 312 of the vehicle seat 310 includes a seat back frame member 322 preferably having a substantially rectangular shape and made of a tubular steel or any other appropriate shape and type of material. The seat back frame member 322 preferably has an upper end 323, a lower end 324 and two sides 325 and 326. As shown, the seat back frame member 322 is a single piece, bent and shaped tubular member but may alternatively be made having any known or appropriate configuration or sub-assemblies.

The seat back member 312 of the vehicle seat 310 further includes a seat cushion presenting device 330 connected to the seat back frame member 322. The seat cushion presenting device 330 includes a seat back cushion support member 332. The seat back cushion support member 332 is preferably constructed as a steel wire basket design having a central body portion 334 extending over the middle portion of the seat frame member 322 from the upper end 323 toward the lower end 324 and a pair of side members 331 having a substantially wire rod construction. However, the seat back cushion support member 332 may alternatively be made from plastic and other materials and may also be made in alternative configurations as long as it will appropriately function to support a seat cushion material (not shown) and connect to the seat back frame member 322 and function with the seat cushion presenting device 330 as described herein.

The seat back cushion support member 332 further includes an upper end 335 for connection with the upper end 323 of the seat back frame member 322 and a lower end 336 for connection with the lower end 324 of the seat back frame member 322. The lower end 336 of the seat back cushion support member 332 includes an extended member 337 interconnecting the body portion 334 and the seat back frame member 322. The extended member 337 preferably includes a pair of extension members 338 and 339 for connection to one of preferably the sides 325 and 326 and the lower end 324. In particular, the extended member 337 is preferably a relatively rigid wire rod connected to the seat back frame member 322 but may alternatively be of any appropriate configuration.

The seat back cushion support member 332 is preferably connected to the seat back frame member 332 using any known or appropriate connection that will provide a durable and lasting connection and will functionally accommodate the movement of the seat back cushion support member 332 between the stowed and design positions as well as during use. Preferably the seat back cushion support member 332 is connected to the seat back frame member 322 by having the ends of the seat back cushion support member 332 anchored in a passage in the seat back frame member 322 as is conventional. Alternatively, it is also possible to use a connector or similar device (not shown).

Figure 25:
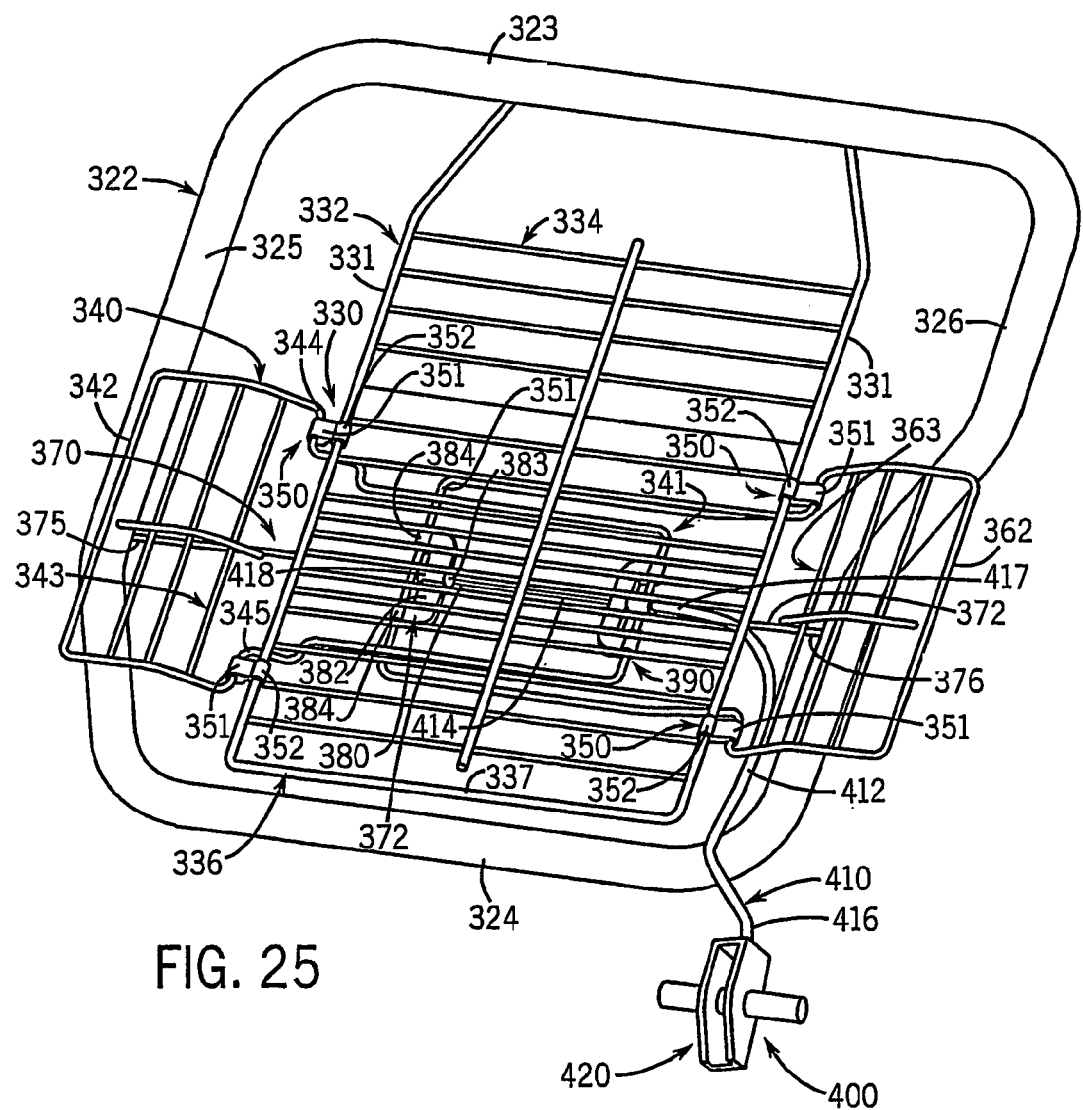
FIG. 25 is a front partial perspective view of an alternate embodiment of the vehicle seat back member of FIG. 22.

In one alternate embodiment as shown in FIG. 25, the seat back cushion support member 332 does not include the extended member 337 and the extension members 338 and 339. Instead, the lower end 336 of the seat back cushion support member 332 moves outward from the seat frame member 322 along with the main body portion 334 of the seat back cushion support member 332. This alternate embodiment has the advantage of providing additional support particularly in the lower back region to an occupant of the vehicle seat 310.

As best shown in FIG. 23, the seat cushion presenting device 330 connected to the seat back frame member 322 further preferably includes first and second presenting members 340 and 360. The first and second presenting members 340 and 360 are also preferably wire form structures utilizing conventional standard gage wire for use in vehicle seating. Alternatively, the first and second presenting members 340 and 360 may be made utilizing any known or appropriate material and construction. The first and second presenting members 340 and 360 are relatively mirror images of each other so they will be described by way of recitation to the first presenting member 340 with the understanding that the similar description is accurate and appropriate for the second presenting member 360 except as specifically noted.

The first presenting member 340 has a first end 341 located with respect to and on the back side of the main body portion 334 of the seat cushion support member 330 and an opposite distal end 342 located on the front side of and with respect to the seat back frame member 322. The first end 341 has a substantially U-shaped, wire form construction extending substantially horizontally between the sides 325 and 326 of the seat back frame member 322 and preferably contained within the thickness of the seat back frame member 322 when the seat cushion support member 330 is located in the stowed position.

The second end 342 of the first presenting member 340 preferably includes a side bolster support member 343 having a substantially wire frame support structure and extending substantially between the central body portion 334 of the seat cushion support member 330 and the side 325 of the seat back frame member 322. Preferably the second end 342 and the side bolster support portion 343 extend vertically more than the first end 341 to provide more support to an occupant of the vehicle seat 310 but may alternatively have the same or smaller relation to the first end 341. The side bolster support portion 343 preferably includes a first and second connection points 344 and 345 located between the first and second ends 341 and 342, respectively, and with respect to the side member 331 of the central body portion 334 of the seat cushion support member 330. The first and second connection points 344 and 345 are preferably a substantially vertically extending portion of the wire form structure comprising the first presenting member 340 but may alternatively be any attached, connected or other integrated structure.

The seat cushion presenting device 330 further includes at least one connection clip 350 for connecting the first presenting member 340 to the side member 331 of the central body portion 334 of the seat cushion support member 332. The connection clip 350 includes a first portion 351 for making a rotatable connection with the first connection point 344 of the first presenting member 340. The connection clip 350 also includes a second portion 352 located distal of the first portion 351. The second portion 352 is adapted to preferably make a rotatable connection with the side member 331 of the central body portion of the seat cushion support member 332. While the first and second portions 351 and 352 are adapted for achieving a rotatable connection, they are also preferably adapted such that at their respective points of connection, they do not allow translation of the first presenting member 340 with respect to seat cushion support member 332. The connection clip 351 is preferably made of a plastic material but may alternatively be made from any known or appropriate material and construction to perform the connection function as described above.

The seat cushion presenting device 330 further includes a presenting device support member 370 in the form of a corded wire 372 extending and stretched taught between the sides 325 and 326 of the seat back frame member 322. The wire 372 includes a first end connected to side 325 and a second end connected to side 326. The first and second ends 375 and 376 are connected to the sides 325 and 326, respectively, using any known or appropriate type of connection. By way of example, a portion of the end 375 is inserted in a hole in the side 325 and the wire 372 has a portion extend through a detent in the side 325 of the seat back support member 322. Preferably, a weld is made between the wire 372 and the side 325 in the area of the detent to fixedly secure the wire 372 to the seat back frame member 322. Further, the wire 372 is preferably connected to the seat back frame member 322 such that wire 372 is located and aligned with the back side of the seat back frame member 322 such that the first and second presenting members 340 and 360 may be aligned within the thickness of the seat back frame member 322. While the presenting device support member 370 is disclosed as a wire 372, it should be understood that other types of structure may be utilized.

First and second guide members 380 and 390 are provided for connecting the first and second presenting members 340 and 360, respectively, to the presenting device support member 370. The first and second guide members 380 and 390 are essentially identical and will be described with respect to the first guide member 380 with any material differences specifically noted. The first and second guide members 380 and 390 are preferably made from a plastic material but alternatively be made from any appropriate material.

The first guide member 380 includes a first central portion 382 having a passage 383 therein for receiving and movement along the wire 372. The passage 383 is preferably a hole but may have any other appropriate shape. The first guide support member 380 includes a pair of legs 384 for providing a rotational connection with the first end 361 of the second presenting member 360 and may alternatively have any other appropriate structure for providing such a connection. Thus, the first guide member translates along the wire 372 and causes the second presentation member 360 to force the seat cushion support member to extend from the seat back frame 322 via the clip connectors 350 and, at the same time, the side bolster portion 363 is extended from the seat back support frame 322.

The seat cushion presenting device 330 further includes an activation member 400 for moving the first and second presenting members 340 and 360 together along the presenting device support member 370. The activation member 400 preferably includes a cable 410 for activating the cushion presenting device 330. The cable 410 preferably has a sheath or conduit 412 and a wire 414. The conduit 412 preferably has a fist end 416 anchored with respect to the cushion presenting device 330 such as by connection to a support 422 or other fixed aspect of the seat 310. The conduit 412 preferably has a second end 417 anchored in the guide member 390.

The first end of the wire 414 is preferably attached to a stationary part and the first end 416 of the conduit 412 is anchored to the seat frame 314 and the foldable vehicle seat 310 provides the movement of conduit 412 with respect to the wire 414 as the vehicle seat 310 is moved from the stowed position to the design position. In this regard, the wire 414 preferably has a first end attached to a lost motion device 430 connected to a support 422 or other structure stationary with respect to the seat base 314. The wire 414 further has a second end 418 anchored to the guide member 380 once the wire 414 of the cable 410 has passed through the passage 483. The lost motion device 430 preferably includes the first end of the wire 414 connected to one end of a compression spring contained within a housing of the lost motion device 430 such that as a force is applied to the wire 414, the first end of the wire 414 will act against the spring which will apply an equal and reactive force against the wire 414 until the compression spring reaches its limit of travel within the housing. Thus, the lost motion device 430 provides an additional level of support and cushion to the cushion presenting device 330 when an occupant of the seat 310 puts a force into the seat back 312.

In an alternate embodiment, the activation member 400 includes a drive unit 420 connected to the cable 410. When the drive unit 420 is activated, it applies a force on the wire 414 causing it to move within the conduit 412. Since the conduit 412 is anchored, the force applied to the wire 414 causes the second end 418 of the wire 414 and the second end 417 of the conduit 412 to move together (i.e., toward each other) thereby causing the first and second guide members 380 and 390 to move together and to move the first ends 341 and 361 together to cause the fist and second presenting members 340 and 360 move together and thereby causing the seat cushion support member 332 to extend from the seat back support frame 322.

Thus, it should be understood that the drive unit 420 may be any simple mechanical device and may alternatively have a handle attached for the occupant to move the handle and cause the force to be applied to the wire 414 thereby activating the cushion presenting device 330. Alternatively, the drive unit 420 may be motorized such that the seat cushion support member 330 may be extended automatically by the use of a simple switch.

Referring to FIGS. 1–12, the seat 10 of the present invention is preferably supported on a pair of supports 22 for connection with a vehicle (not shown) or the floor of a vehicle. It should be appreciated that it is possible to eliminate the supports 22 by connecting the seat 10 directly to the vehicle's body in white or the floor of the vehicle (not shown).

The seat back 12 of the seat 10 includes a seat back frame member 24 in the form of a bent, U-shaped tubular member preferably having a substantially round cross section and including a first side 25, a second side 26 and a top 27.

The seat base 14 preferably includes a seat base frame including front support member 31 and a rear support member 32. The front support member 31 preferably includes a surface 33 having a ramped angle aligned toward the seat back 12 to operate as an anti-submarine surface. The front support member 31 is preferably fixedly attached to and extends between a first side member 35 and a second side member 36 the first and second side members 35 and 36 have a substantially c-shaped cross-section and extend toward the lower end of the seat back 12 to the rear support member 32 from the front support member 31 to form a substantially rectangular shaped seat base 14.

The seat base 14 is supported on the supports 22 using a pair of support leg members 37 and 38 for the front of the vehicle seat proximate the front support member 31. The support leg members 37 and 38 each preferably have a first or lower end 39 and 40, respectively, connected to a respective support 22 and each have a second or upper end 41 and 42, respectively, pivotally connected to the side members 35 and 36, respectively. Thus, the support leg member 37 pivots on an axis 43 defined by a pin 45 and the support leg member 38 pivots on preferably the same axis 43 defined by a pin 46.

Thus, in view of the above, it should be appreciated that the seat base 14 and its related structure have their motion defined at least partially by the support leg members 37 and 38. The folding vehicle seat further includes a pair of folding mechanisms 50 interconnecting the seat back 12, the seat base 14 and the supports 22. The pair of folding mechanisms 50 preferably include a first folding mechanism 50 associated with the side 25 of the seat back 12 and the side member 35 of the seat base 14 and a second folding mechanism 50 associated with the side 26 of the seat back 12 and the side member 36 of the seat base 14. The first side 25 of the seat back frame member 24 is preferably connected to the first folding mechanism 50 via a bracket 28 and the second side 26 of the seat back frame member 24 is connected to the second folding mechanism 50 via the bracket 29 utilizing bolts 30 or any other type of known or appropriate fastener. It should be understood that it is possible to directly connect the folding mechanisms 50 with the seat back frame member 24. Further, it should be understood that it is further possible to have the seat back frame member 24 integrated directly into the folding mechanisms 50 such that there is no need for a separate connection. Each folding mechanism 50 includes an activation member 52 as more fully described below.

Figure 6:
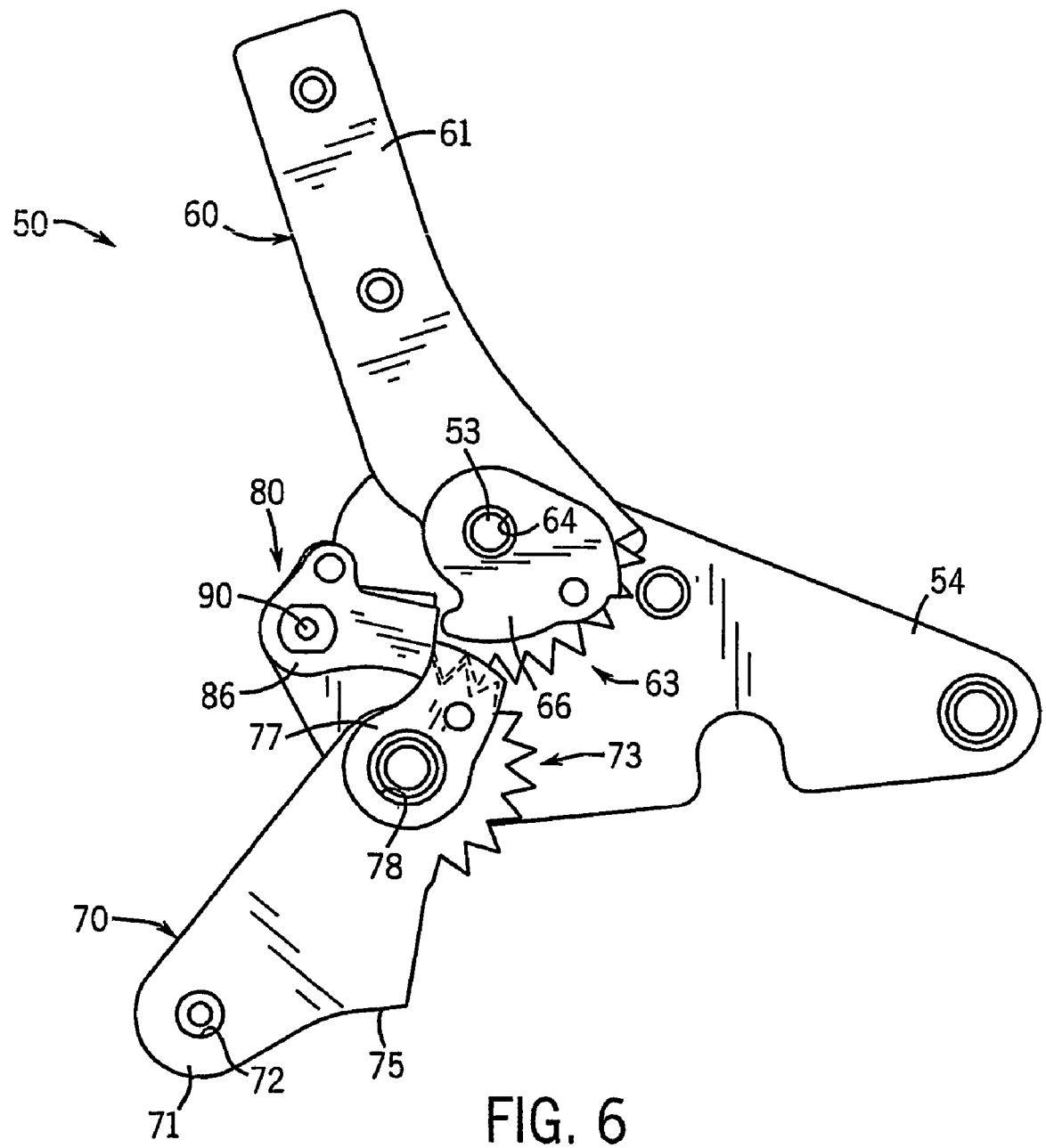
FIG. 6 is an isolated, partial side view of the vehicle seat of FIG. 1 showing the detail of a vehicle seat folding mechanism according to the present invention.
Figure 7:
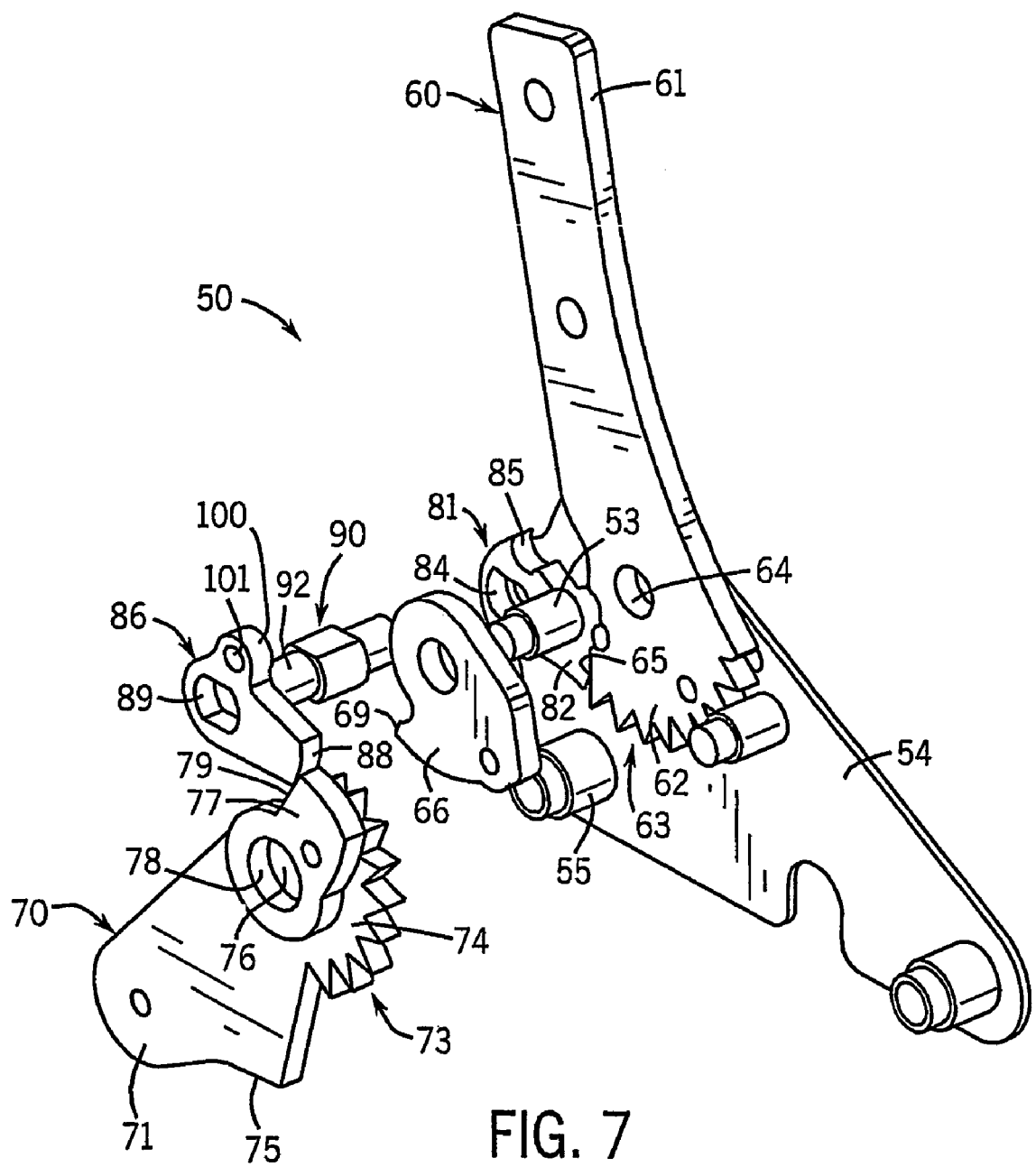
FIG. 7 is an exploded partial, perspective view of the vehicle seat folding mechanism according to the present invention.
Figure 8:
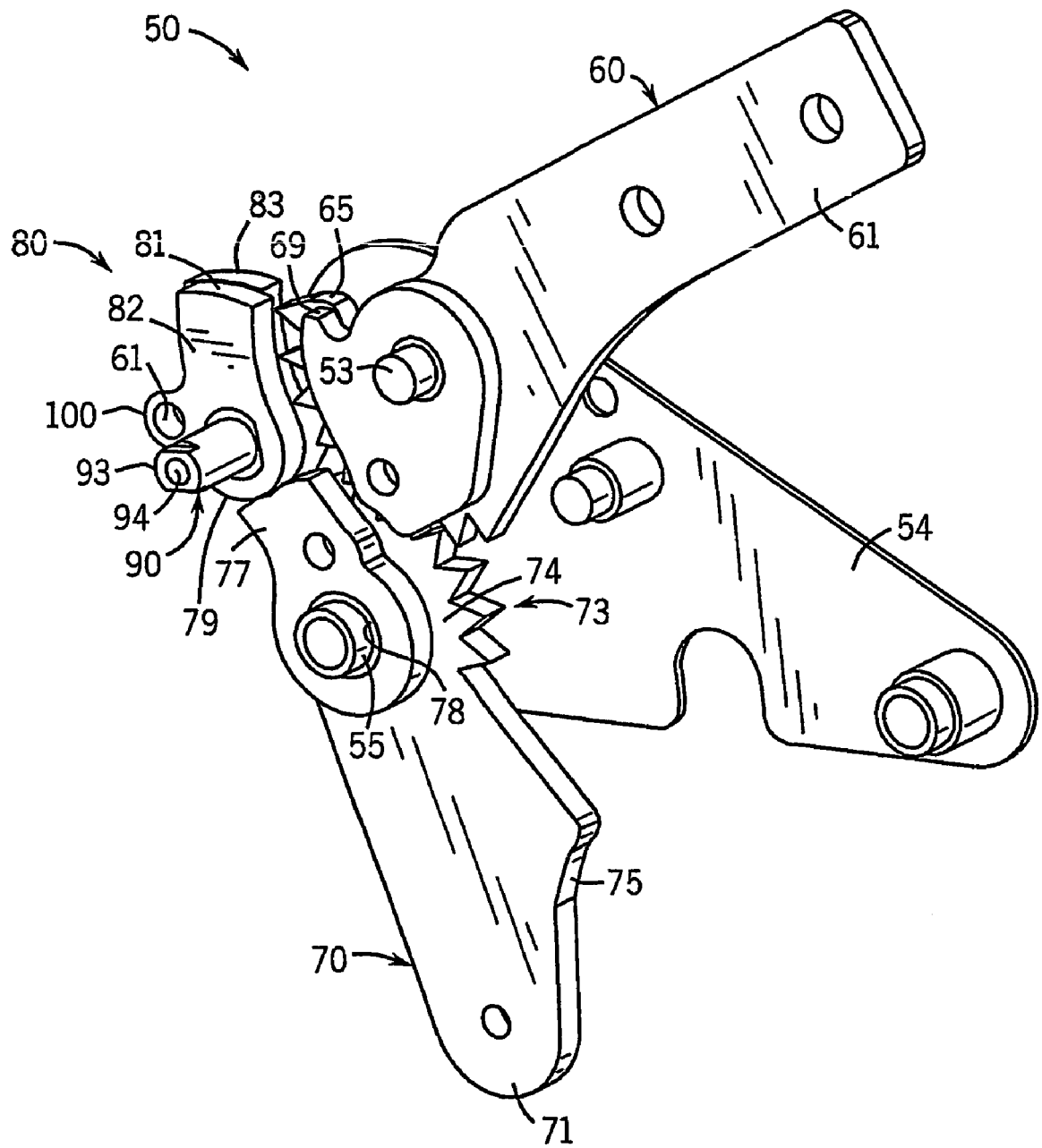
FIG. 8 is an isolated, partial side view similar to that shown in FIG. 7 showing the detail of a vehicle seat folding mechanism in an alternate position with the seat folding mechanism activated.

Referring more particularly now to FIG. 6 through FIG. 8 there is shown a folding mechanism 50 including a first or upper member 60 and a lower member 70. The upper member has a first or upper end 61 adapted to be connected to the seat back 12 as described above and a second or lower end 62 including a preferably unitary row of arcuately defined teeth 63. The upper member 60 preferably includes a passage 64 in the form of a hole and is pivotally supported on a pin member 53 journaled to support plate 54 such that the upper member rotates on an axis defined by the pin member 53. The upper member further includes an abutment surface 65 preferably located at an end of the teeth 63 and aligned to prevent rotation of the upper member 60 on the pin 53. The upper member 60 further preferably has associated and connected therewith a cam tab member 66 in the form of an extension member and including a passage 68 in the form of a hole aligned with the passage 64 of the lower member 60. The cam tab member 66 further preferably includes an abutment surface 69 located on one side of the cam tab member 66. Preferably the cam tab member 66 is fixedly secured such as by welding or staking with the upper member 60 such that the upper member 60 may only move when the cam tab member 66 is free to move. Alternatively, the cam tab member 66 may be made as a unitary part of the upper member 60.

The support plate 54 also preferably includes a second pin member 55 spaced in a predefined relationship with respect to the pin 53. The support plate 54 is preferably adapted to be connected to the seat base 14.

The lower member 70 of the folding mechanism 50 preferably includes a lower end 71 adapted for connection to the support 22 by having a passage 72 preferably in the form of a hole to receive and pivot on a pin (not shown). The lower member 70 has a second end 74 distal of the first end 71 and including a preferably unitary row of arcuately defined teeth 73 preferably disposed on the end 74 such that the teeth 73 will mesh with the teeth 63 during the movement of the folding vehicle seat 10 between the stow position shown in FIG. 2 and the design position shown in FIG. 5.

It should be appreciated that the teeth 63 and teeth 73 continuously engage such that movement of the seat back 12 and the upper member 60 attached thereto causes synchronous movement of the lower member 70 and the seat base 14 attached thereto. Accordingly, the seat 10 can be operated with one hand by a user simply moving the seat back 12.

Figure 5:
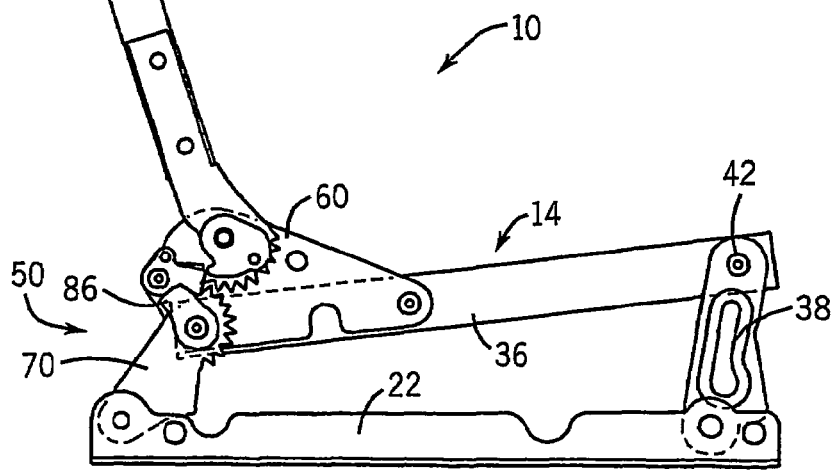
FIG. 5 is a side view of the folding vehicle seat of FIG. 1 in the design position.

The lower member 70 further includes an abutment surface 75 preferably located between the first end 71 and the second end 74 for engaging a pin (not shown) on the support 22 when the folding vehicle seat 10 is located in the design position of FIG. 5. The lower member 70 preferably includes a passage 76 in the form of a hole located in the second end 74 and with respect to the teeth 73 for receiving the pin 55 which defines an axis upon which the lower member 70 preferably rotates. Further, the lower member 70 preferably has associated and connected therewith a cam tab member 77 in the form of an extension member and including a passage 78 in the form of a hole aligned with the passage 76 of the lower member 70. The cam tab member 77 further preferably includes an abutment surface 79 located on one side of the cam tab member 77. Preferably the cam tab member 77 is fixedly secured such as by welding or staking with the lower member 70 such that the lower member 70 may only move when the cam tab member 77 is free to move. Alternatively, the cam tab member 77 may be made as a unitary part of the lower member 70.

The folding mechanism 50 further preferably includes a dual cam lock mechanism 80 including a first upper cam member 81, a second upper cam member 86 and a cam pin member 90. The first upper cam member 81 is associated with the upper member 60 for engaging the upper member 60 and preventing its movement when the folding vehicle seat 10 is in the design position. The first upper cam member 81 preferably includes a lobe 82 having a cam surface 83 and a passage 84 for connection and rotation of the first upper cam member 81 with the cam pin member 90.

The first upper cam member 81 further preferably includes a notch 85 located on one side thereof. The notch 85 is for receiving one end of a biasing member (not shown) preferably in the form of a clock spring for biasing the first upper cam member 81 in a first predetermined direction about the axis of rotation defined by the cam pin member 90. Preferably the first predetermined direction of rotation is chosen such that the first upper cam member 81 will have the cam surface 83 engage the abutment surface 65 of the first upper member 61 when the seat 10 is in the design position. The passage 84 of the first upper cam member 81 includes a double-D design such that it has two flat portions disposed approximately opposite of each other in the passage 84.

The second upper cam member 86 is substantially similar to the first upper cam member 81 but preferably has a few unique aspects. The second upper cam member 86 includes a lobe 87 having a cam surface 88 for engaging the abutment surface 79 of the third cam tab member 77 of the lower member 70 to prevent movement of the lower member 70 when the seat 10 is in the design position.

The second upper cam member 86 further preferably includes a passage 89 having a substantially round configuration in the form of a hole and including a pair of flat surface portions disposed substantially opposite each other. The second upper cam member 86 further preferably includes a second lobe 100 including a passage 101 in the form of a hole for receiving one end of a biasing member (not shown) for biasing the second upper cam member 86 in a predefined direction about the axis defined by the cam pin member 90.

The cam pin member 90 preferably includes a first post extension portion 91 journaled or otherwise pivotally connected with respect to the support plate 54. The first post extension portion 91 preferably has a round cross section.

The cam pin member 90 preferably includes a second post extension portion 92 located distally opposite the first post extension portion 91. The second post extension portion 92 preferably has a round cross section having an axis of rotation aligned with an axis of rotation of the first post extension portion 91. Similarly, the second post extension portion 92 is journaled or otherwise pivotally connected with respect to an opposite support plate (not shown) but extending beyond the opposite support plate such that an end 93 of the cam pin member 90 having a passage 94 therein may be connected to a handle member (not shown) for applying a force to rotate the cam pin member 90 and activate the folding mechanism 50.

The cam pin member 90 further includes a central portion 95 having a substantially round cross section including a pair of flat portions substantially oppositely disposed from each other. The central portion 95 is preferably complimentary with the passage 84 of the first upper cam member 81 and the passage 89 of the second upper cam member 86 such that rotation of the cam pin member 90 causes the first and second upper cam members 81 and 86, respectively, to also rotate on the axis defined by the cam pin member 90.

As can be seen best in FIG. 8, when the cam pin member 90 is rotated such that the first and second upper cam members 81 and 86 are disengaged from the upper member 60 and the lower member 70 and its third cam tab member 77, the seat back 12 of the folding vehicle seat 10 is free to rotate. As the seat back 12 rotates in one direction, so does the upper member 60 and due to the meshing of the teeth 63 of the upper member and the teeth 73 of the lower member 70, the lower member 70 pivots about the passage 72 in an opposite direction.

Figure 2:
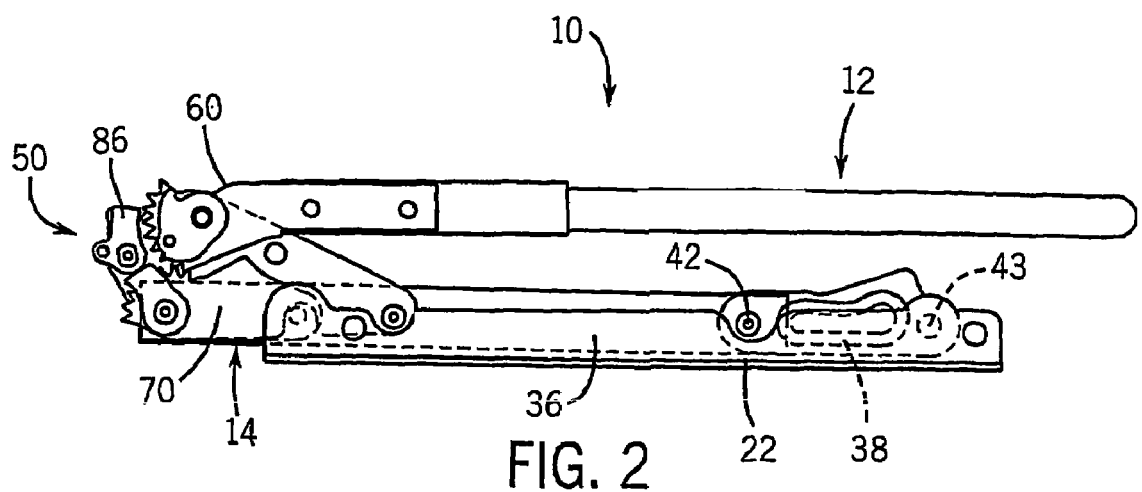
FIG. 2 is a side view of the folding vehicle seat of FIG. 1 located in a stow position.
Figure 3:
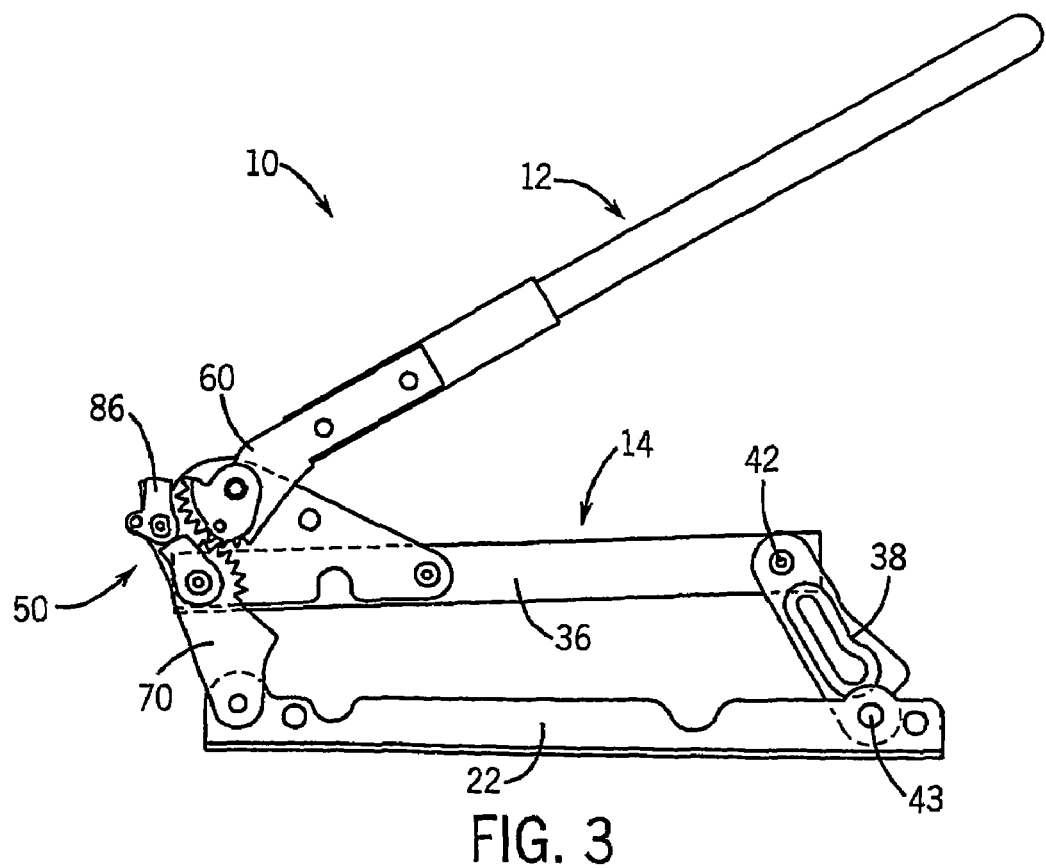
FIG. 3 is a side view of the folding vehicle seat of FIG. 1 moved partially from the stow position and toward a design position.
Figure 4:
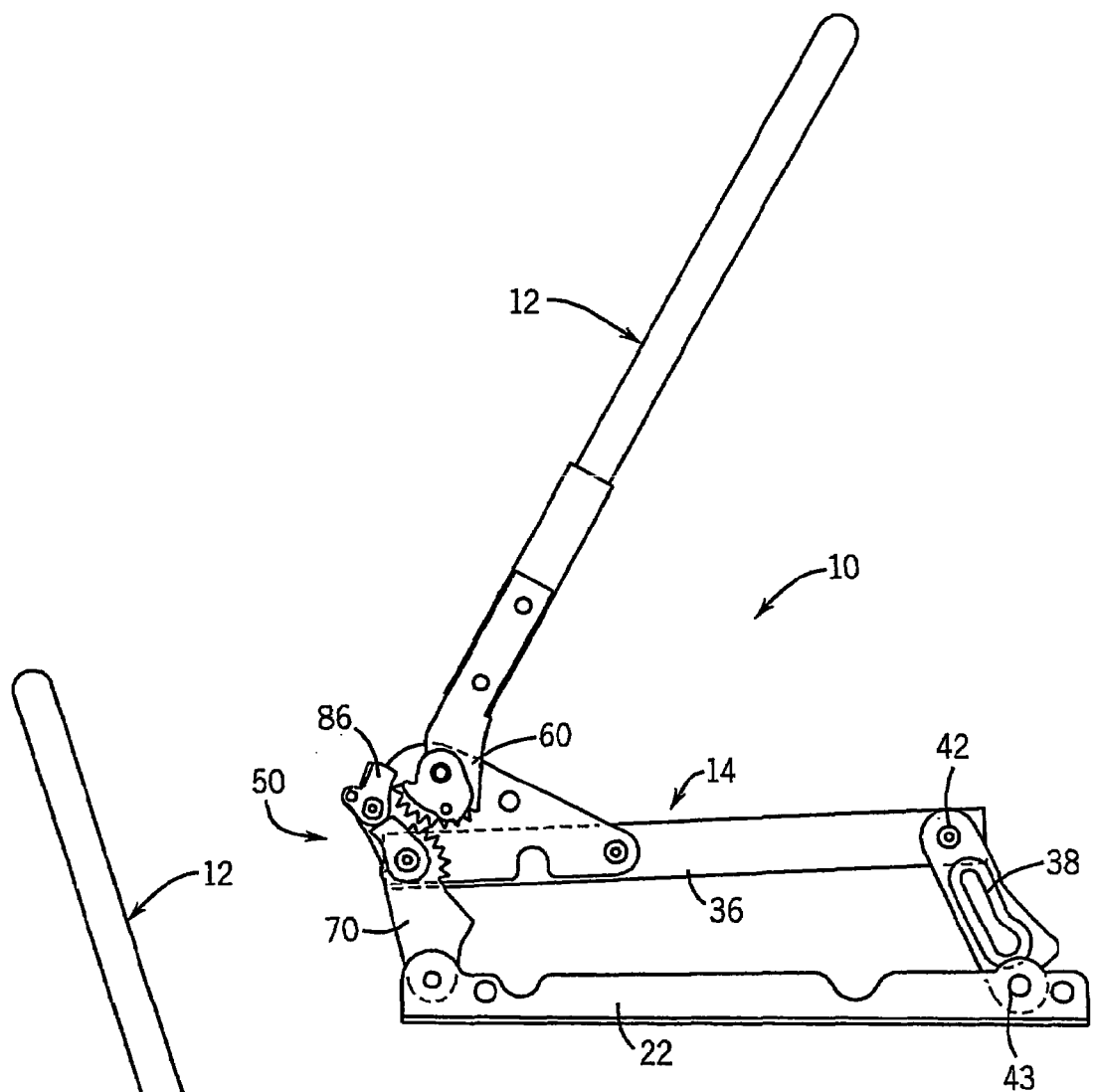
FIG. 4 is a side view of the folding vehicle seat of FIG. 1 moved partially from the design position and toward the stow position.

Referring to FIG. 2, the seat 10 is shown in a relatively very highly compact stow position. As a user lifts the seat back 12 the folding mechanism 50 causes the lower member 70 to rotate in an opposite direction. As the lower member 70 rotates, the seat base 14 is moved, causing the legs 37 and 38 to pivot from a substantially horizontal position due to the four bar linkage connection similar to a parallelogram, see FIG. 3. As the seat back 12 is further rotated, the seat 10 opens up (FIG. 4) and ultimately is located in the design position shown in FIG. 5 wherein the seat 10 is ready for an occupant. When the vehicle user desires that the seat 10 be put in the stow position, such as when a user needs additional storage in the rear of a vehicle, the cam pin member 90 is rotated a sufficient distance such that the first and second upper cam members 81 and 86 are disengaged allowing the user to move the seat back 12 in an opposite direction and the seat 10 returns to the position of FIG. 4 until the seat 10 reaches the stow position of FIG. 2.

Figure 9:
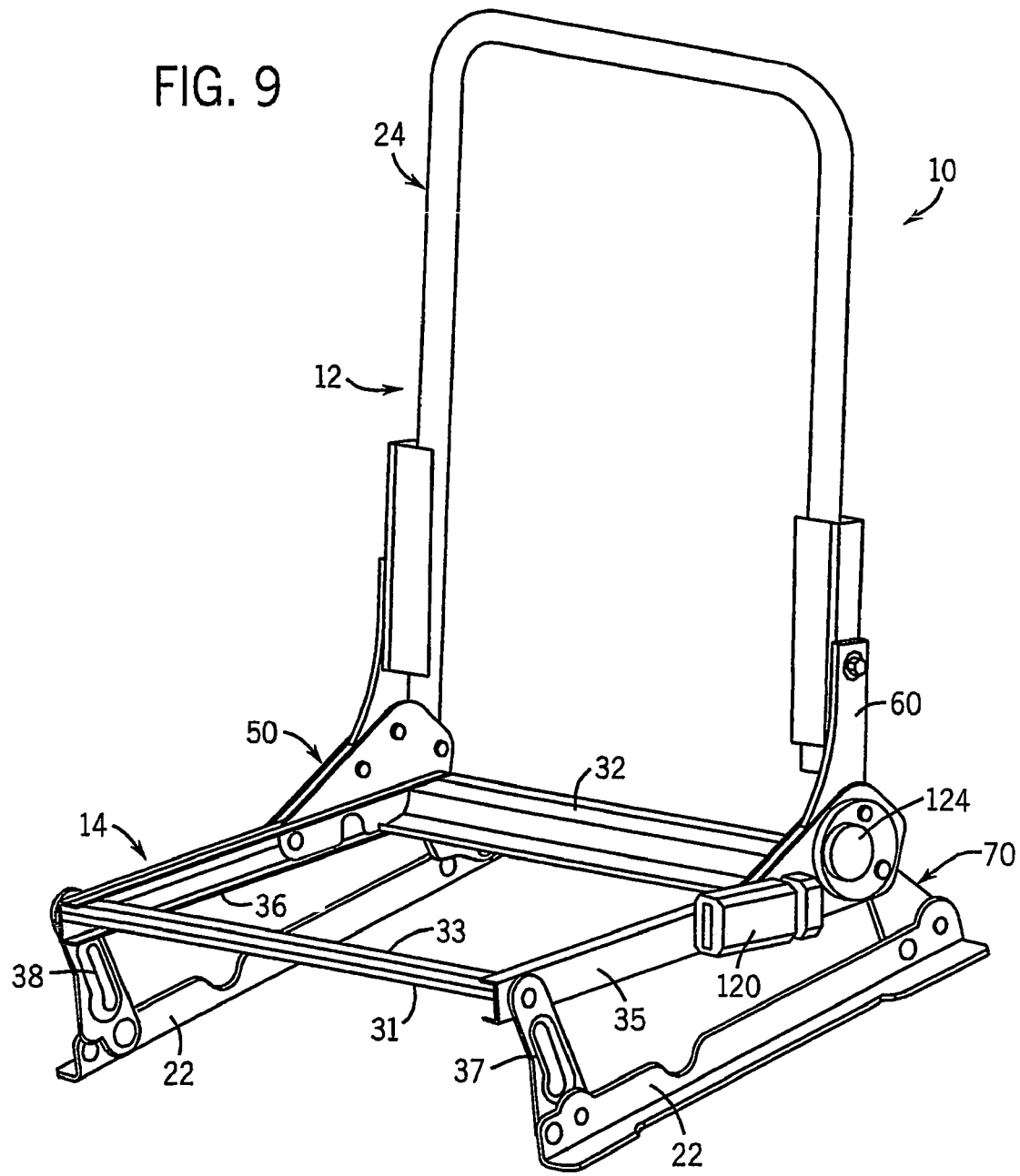
FIG. 9 is an isolated, partial perspective view of an alternate embodiment of the vehicle seat of FIG. 1.

In an alternate embodiment shown in FIG. 9, a motor 120 and gear drive mechanism 124 are attached to the folding mechanism 50. The gear drive mechanism 124 is connected with the upper member 60 to move the upper member 60 such that the seat 10 can be automated to move between the stow and design positions. The motor 120 is supplied with power from the vehicles power source and a switch (not shown) may be conveniently provided anywhere for activation by the user.

Figure 10:
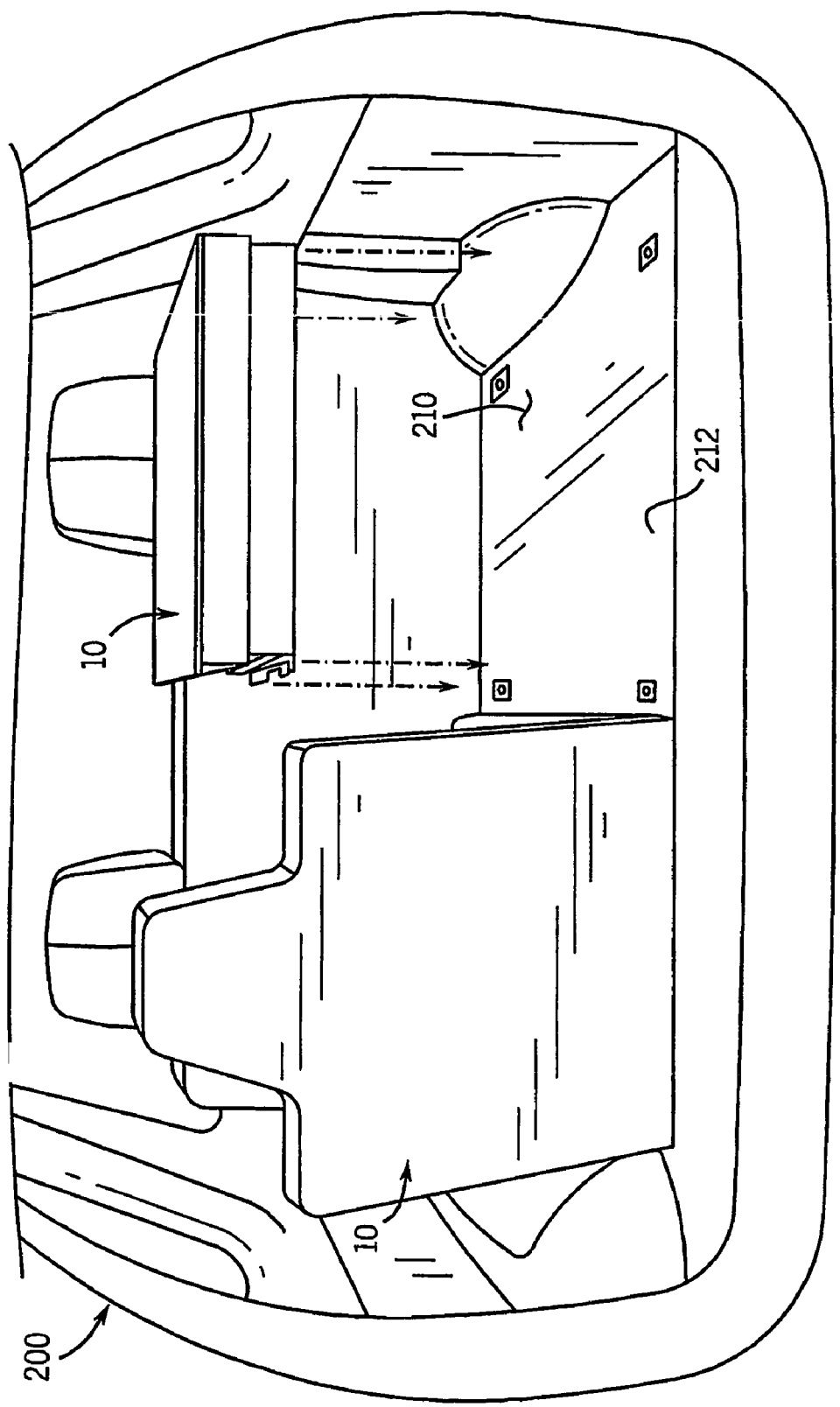
FIG. 10 is a rear view of a vehicle including a third row having a pair of folding vehicle seats including a cartridge design according to the present invention.
Figure 11:
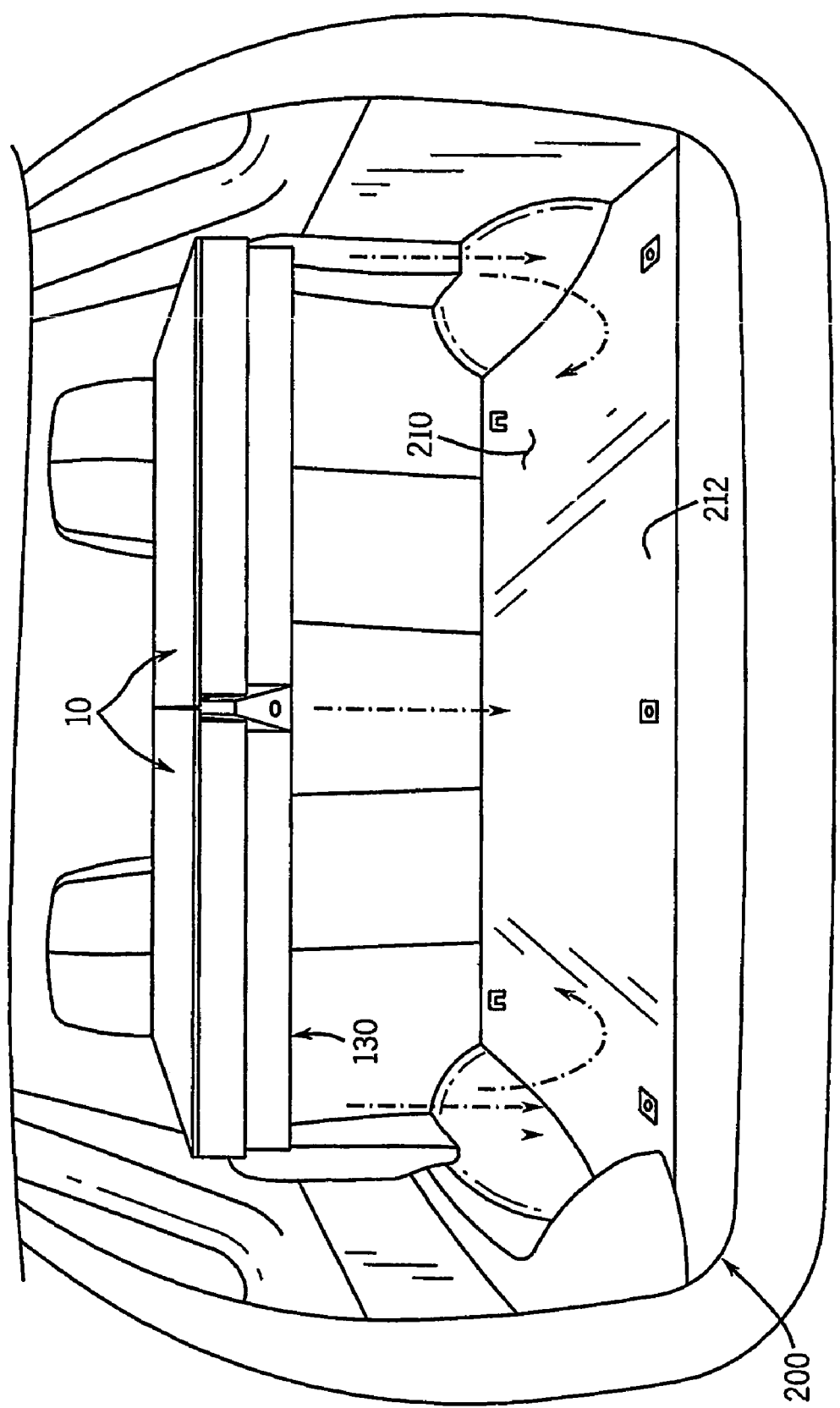
FIG. 11 is a rear view of a vehicle including a third row having a pair of folding vehicle seats according to an alternate embodiment including a cartridge design according to the present invention.
Figure 12:
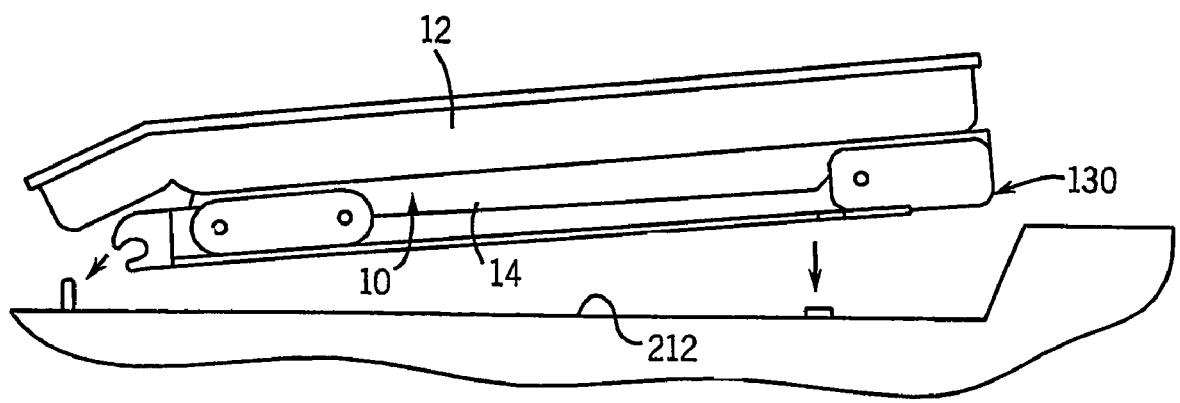
FIG. 12 is a schematic side view of the embodiment of FIG. 11 showing the technique for inserting the vehicle folding seat of the present invention into a vehicle.

In FIG. 10 there are shown two folding vehicle seats 10 in a rear cargo area 210 of a vehicle 200. In this embodiment, the seats 10 are designed to be removable from the vehicle 200 to provide for even further additional storage in the rear cargo area 210. As shown by the arrows, the seat 10 is connected to a floor 212 of the vehicle 200 using any known or appropriate removable connection including one such as that shown in FIG. 12. In FIG. 11 a further alternate embodiment of the present invention is shown, wherein two folding vehicle seats 10 are integrated into a unit 130 and can be removed from the rear cargo area 210 of the vehicle 200 with removal of the unit 130. Similarly, the unit 130 can be connected to the floor 212 using any known or appropriate removable connection as shown in FIG. 12.

While a preferred embodiment of the invention has been described in connection with the illustrations, and various modifications and alternatives thereto have been referred to in the written text, the present invention generally relates to a folding vehicle seat and folding mechanism having an upper arm member and a lower arm member in meshing relationship including first and second upper cams associated with the upper and lower arm members and a third lower cam tab associated with the lower arm member to provide a relatively very thin profile seat when in a stow position and which can be very easily (such as by a one hand operation) moved from a stow position to a design position.

The invention is therefore not to be limited to the materials, shapes, orientations and proportions illustrated and described.

What is claimed is:

1. A vehicle seat, comprising:
a seat back;
a seat base operatively connected to the seat back;
a plurality of support leg members operatively connected to the seat base; and
a folding mechanism for interconnecting the seat back, the seat base, and the plurality of support leg members, the folding mechanism comprising:
a support plate operatively connected to the seat base;
an upper member having a first end operatively connected to the seat back and a second end including a first plurality of teeth, the upper member connected to the support plate via a first pin member and movable about an axis defined by the first pin member; and
a lower member having a first end operatively connected to one of the plurality of support leg members and a second end including a second plurality of teeth for engaging the first plurality of teeth, the lower member connected to the support plate via a second pin member and movable about an axis defined the second pin member,
wherein the first plurality of teeth continuously engage the second plurality of teeth such that movement of the upper member causes synchronous movement of the lower member between a design position and a stow position.

2. The vehicle seat of claim 1, wherein the upper member includes a first cam tab having a first cam tab abutment surface, the lower member including a second cam tab having a second cam tab abutment surface for selectively engaging the first cam tab abutment surface such that the lower member may move only when the second cam tab is free to move.

3. The vehicle seat of claim 2, wherein the first cam tab is formed as a unitary part of the upper member, and wherein the second cam tab is formed as a unitary part of the lower member.

4. The vehicle seat of claim 2, wherein the upper member includes a first abutment surface adjacent the first plurality of teeth for limiting the movement of the upper member relative the first pin member.

5. The vehicle seat of claim 1, wherein the folding mechanism includes a dual cam lock mechanism comprising:
a first upper cam member engaging the upper member and preventing the movement of the upper member when the vehicle seat is in the design position;
a second upper cam member engaging the lower member and preventing the movement of the lower member when the vehicle seat is in the design position; and
a cam pin member movably engaging the first upper cam member and the second upper cam member.

6. The vehicle seat of claim 5, wherein the first upper cam member includes a notch for receiving an end of a biasing member, the biasing member biasing the first upper cam member in a first predetermined direction relative an axis defined by the cam pin member.

7. The vehicle seat of claim 6, wherein the predetermined direction such that the first upper cam member engages the first abutment surface when the vehicle seat is in the design position.

8. The vehicle seat of claim 1, further comprising:
a motor; and
a gear drive mechanism operatively connected to the motor and the upper member, wherein the motor and the gear drive mechanism cooperate to move the vehicle seat between the design position and the stow position.

9. A folding mechanism for a vehicle seat having a seat back and a seat base, comprising:
a support plate;
an upper member having a first end operatively connected to the seat back and a second end including a first plurality of teeth, the upper member connected to the support plate via a first pin member and movable relative an axis defined by the first pin member, the upper member further including a first abutment surface adjacent the first plurality of teeth for limiting the movement of the upper member relative the first pin member; and
a lower member having a first end operatively connected to one of a plurality of support leg members and a second end including a second plurality of teeth for engaging the first plurality of teeth, the lower member connected to the support plate via a second pin member and movable relative an axis defined by the second pin member,
wherein the first plurality of teeth continuously engage the second plurality of teeth such that movement of the upper member causes synchronous movement of the lower member between a design position and a stow position.

10. The folding mechanism of claim 9, wherein the upper member includes a first cam tab having a first cam tab abutment surface, and wherein the lower member includes a second cam tab having a second cam tab abutment surface for selectively engaging the first cam tab abutment surface such that the lower member may move only when the second cam tab is free to move.

11. The folding mechanism of claim 10, wherein the first cam tab is fixedly secured to the upper member, and wherein the second cam tab is fixedly secured to the lower member.

12. The folding mechanism of claim 10, wherein the first cam tab is formed as a unitary part of the upper member, and wherein the second cam tab is formed as a unitary part of the lower member.

13. The folding mechanism of claim 9, further including a dual cam lock mechanism comprising:
a first upper cam member engaging the upper member and preventing the movement of the upper member when the folding mechanism is in the design position;
a second upper cam member engaging the lower member and preventing the movement of the lower member when the folding mechanism is in the design position; and
a cam pin member movably engaging the first upper cam member and the second upper cam member.

14. The folding mechanism of claim 13, wherein the first upper cam member includes a notch for receiving an end of a biasing member, the biasing member biasing the first upper cam member in a first predetermined direction relative an axis defined by the cam pin member.

15. The folding mechanism of claim 14, wherein the predetermined direction is such that the first upper cam member engages the first abutment surface when the folding mechanism is in the design position.

16. The folding mechanism of claim 9, further comprising:
 a motor; and
 a gear drive mechanism operatively connected to the motor and the upper member, wherein the motor and the gear drive mechanism cooperate to move the folding mechanism between the design position and the stow position.

17. A vehicle seat, comprising:
 a seat back;
 a seat base operatively connected to the seat back;
 a plurality of support leg members coupled to the seat base; and
 first and second folding mechanisms for interconnecting the seat back, the seat base, and the plurality of support leg members, each folding mechanism comprising:
  a support plate operatively connected to the seat base;
  an upper member operatively connected to the seat back and movable relative a first pin member, the upper member including a first abutment surface for limiting the movement of the upper member relative an axis defined by the first pin member;
  a lower member operatively connected to one of the plurality of support leg members, the lower member connected to the support plate via a second pin member and movable relative an axis defined by the second pin member; and
  means for continuously engaging the upper member with the lower member such that movement of the upper member causes synchronous movement of the lower member between a design position and a stow position.

18. The vehicle seat of claim 17, wherein the upper member of each folding mechanism includes a first cam tab having a first cam tab abutment surface, the lower member of each folding mechanism including a second cam tab having a second cam tab abutment surface for selectively engaging the first cam tab abutment surface such that each lower member may move only when the respective second cam tab is free to move.

19. The vehicle seat of claim 17, wherein each folding mechanism includes a dual cam lock mechanism comprising:
 a first upper cam member engaging the upper member and preventing the movement of the upper member when the vehicle seat is in the design position;
 a second upper cam member engaging the lower member and preventing the movement of the lower member when the vehicle seat is in the design position; and
 a cam pin member movably engaging the first upper cam member and the second upper cam member.

20. The vehicle seat of claim 19, wherein the first upper cam member includes a notch for receiving an end of a biasing member, the biasing member biasing the first upper cam member in a first predetermined direction relative an axis defined by the cam pin member.

* * * * *